United States Patent
Lee et al.

(10) Patent No.: US 10,212,732 B2
(45) Date of Patent: Feb. 19, 2019

(54) METHOD FOR TRANSMITTING AND RECEIVING UPLINK DATA USING CONTENTION BASED RESOURCES IN WIRELESS COMMUNICATION SYSTEM AND APPARATUS THEREFOR

(71) Applicant: LG ELECTRONICS INC., Seoul (KR)

(72) Inventors: Eunjong Lee, Seoul (KR); Heejeong Cho, Seoul (KR); Genebeck Hahn, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/570,292

(22) PCT Filed: Sep. 25, 2015

(86) PCT No.: PCT/KR2015/010172
§ 371 (c)(1),
(2) Date: Oct. 27, 2017

(87) PCT Pub. No.: WO2016/175398
PCT Pub. Date: Nov. 3, 2016

(65) Prior Publication Data
US 2018/0124824 A1    May 3, 2018

Related U.S. Application Data

(60) Provisional application No. 62/153,525, filed on Apr. 28, 2015.

(51) Int. Cl.
*H04W 74/00* (2009.01)
*H04L 5/00* (2006.01)
*H04W 48/16* (2009.01)
*H04W 72/12* (2009.01)
*H04W 74/08* (2009.01)
*H04W 72/04* (2009.01)

(52) U.S. Cl.
CPC ............. *H04W 74/008* (2013.01); *H04L 5/00* (2013.01); *H04W 48/16* (2013.01);
(Continued)

(58) Field of Classification Search
CPC ............. H04W 74/006; H04W 74/008; H04W 74/0808; H04W 74/0833; H04W 72/1205;
(Continued)

(56) References Cited

U.S. PATENT DOCUMENTS

2009/0175159 A1*  7/2009  Bertrand ........... H04W 72/0406
                                                              370/203
2011/0045863 A1   2/2011  Lee et al.
(Continued)

FOREIGN PATENT DOCUMENTS

WO    2011136586    11/2011

OTHER PUBLICATIONS

PCT International Application No. PCT/KR2015/010172, International Search Report dated Feb. 23, 2016, 12 pages.

*Primary Examiner* — Kevin D Mew
(74) *Attorney, Agent, or Firm* — Lee, Hong, Degerman, Kang & Waimey PC

(57) ABSTRACT

The present specification relates to a method for transmitting medium access control protocol data unit (MAC PDU) in a wireless communication system. The method, which is performed by a terminal, comprises the steps of: transmitting a control signal through a physical uplink channel to a base station; and transmitting the MAC PDU including terminal identifier information for identifying the terminal to the base station using contention resources within contention-based PUSCH zone (CP zone).

11 Claims, 33 Drawing Sheets

(52) U.S. Cl.
CPC ..... *H04W 72/1205* (2013.01); *H04W 74/006* (2013.01); *H04W 74/0808* (2013.01); *H04W 74/0833* (2013.01); *H04W 72/0406* (2013.01); *H04W 72/0446* (2013.01); *H04W 72/1284* (2013.01)

(58) Field of Classification Search
CPC ......... H04W 72/0406; H04W 72/0446; H04W 72/1284; H04W 48/16; H04L 5/00
See application file for complete search history.

(56) References Cited

U.S. PATENT DOCUMENTS

| | | | |
|---|---|---|---|
| 2011/0299492 A1* | 12/2011 | Lee | H04W 4/00 370/329 |
| 2012/0044878 A1 | 2/2012 | Ratasuk et al. | |
| 2012/0082088 A1* | 4/2012 | Dalsgaard | H04L 12/4625 370/315 |
| 2012/0213196 A1* | 8/2012 | Chung | H04B 1/713 370/330 |
| 2012/0294270 A1 | 11/2012 | Yamada et al. | |
| 2013/0163532 A1* | 6/2013 | Anderson | H04W 72/04 370/329 |
| 2013/0163534 A1 | 6/2013 | Anderson et al. | |
| 2013/0163537 A1* | 6/2013 | Anderson | H04W 72/1284 370/329 |
| 2015/0016312 A1* | 1/2015 | Li | H04W 74/0833 370/280 |
| 2016/0219475 A1* | 7/2016 | Kim | H04L 5/00 |
| 2017/0019930 A1* | 1/2017 | Lee | H04W 74/0833 |
| 2017/0311344 A1* | 10/2017 | Lee | H04W 56/00 |
| 2018/0070374 A1* | 3/2018 | Yi | H04W 74/002 |
| 2018/0139668 A1* | 5/2018 | Takahashi | H04W 92/18 |

* cited by examiner

FIG. 2
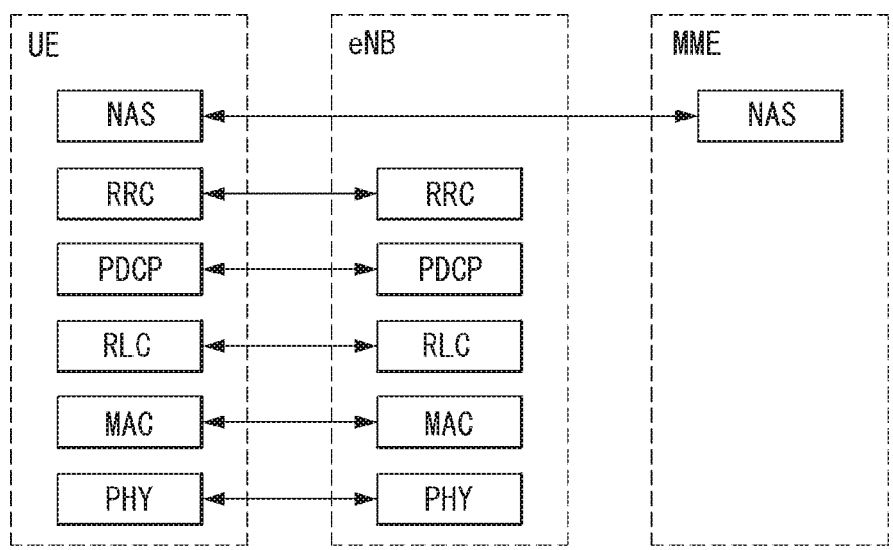
(a) Control plane protocol stack
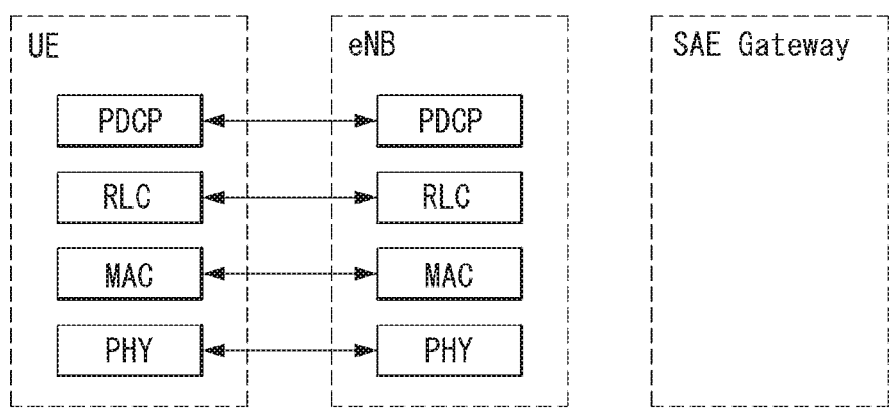
(b) User plane protocol stack PUCCH format 1 and 1b structure
(normal CP case)

PUCCH format 1 and 1b structure
(extended CP case)

PUCCH format 2, 2a and 2b structure
(normal CP case)

PUCCH format 2, 2a and 2b structure
(extended CP case)

FIG. 11

Resource allocation : 18 ACK/NACK channels in standard CP $\Delta_{shift}^{PUCCH} = 2$

| Cell-specific CP offset | | RS orthogonal cover | | | ACK/NACK orthogonal cover | | |
|---|---|---|---|---|---|---|---|
| $\delta_{offset}^{PUCCH}=1$ | $\delta_{offset}^{PUCCH}=0$ | $\bar{n}_{oc}=0$ | $\bar{n}_{oc}=1$ | $\bar{n}_{oc}=2$ | $n_{oc}=0$ | $n_{oc}=1$ | $n_{oc}=2$ |
| $n_{CS}=1$ | $n_{CS}=0$ | n'=0 | | 12 | n'=0 | | 12 |
| 2 | 1 | | 6 | | | 6 | |
| 3 | 2 | 1 | | 13 | 1 | | 13 |
| 4 | 3 | | 7 | | | 7 | |
| 5 | 4 | 2 | | 14 | 2 | | 14 |
| 6 | 5 | | 8 | | | 8 | |
| 7 | 6 | 3 | | 15 | 3 | | 15 |
| 8 | 7 | | 9 | | | 9 | |
| 9 | 8 | 4 | | 16 | 4 | | 16 |
| 10 | 9 | | 10 | | | 10 | |
| 11 | 10 | 5 | | 17 | 5 | | 17 |
| 0 | 11 | | 11 | | | 11 | |

$\Delta_{shift}^{PUCCH} \in \begin{cases} \{1,2,3\} \text{ In the case of standard CP} \\ \{1,2,3\} \text{ In the case of extended CP} \end{cases}$ $\delta_{offset}^{PUCCH} \in \{0, 1, \ldots, \Delta_{shift}^{PUCCH} - 1\}$ Cell - specific CP offset $n_{oc}$            Orthogonal sequence index for ACK/NACK
$\bar{n}_{oc}$            Orthogonal sequence index for RS
$n_{cs}$            Cyclic shift value of CAZAC sequence
$n'$       ACK/NACK resource index used for channelization in RB

FIG. 12

| Cyclic shift | $OC_{index}=0$ | $OC_{index}=1$ | $OC_{index}=2$ | |
|---|---|---|---|---|
| 0 | | | | ⎫ |
| 1 | | | | ⎬ ACK/NACK |
| 2 | | | | ⎪ |
| 3 | | | | ⎭ |
| 4 | ///// | ///// | ///// | Guard shift |
| 5 | + + + + | + + + + | + + + + | ⎫ |
| 6 | + + + + | + + + + | + + + + | ⎪ |
| 7 | + + + + | + + + + | + + + + | ⎬ CQI |
| 8 | + + + + | + + + + | + + + + | ⎪ |
| 9 | + + + + | + + + + | + + + + | ⎪ |
| 10 | + + + + | + + + + | + + + + | ⎭ |
| 11 | ///// | ///// | ///// | Guard shift |

FIG. 13

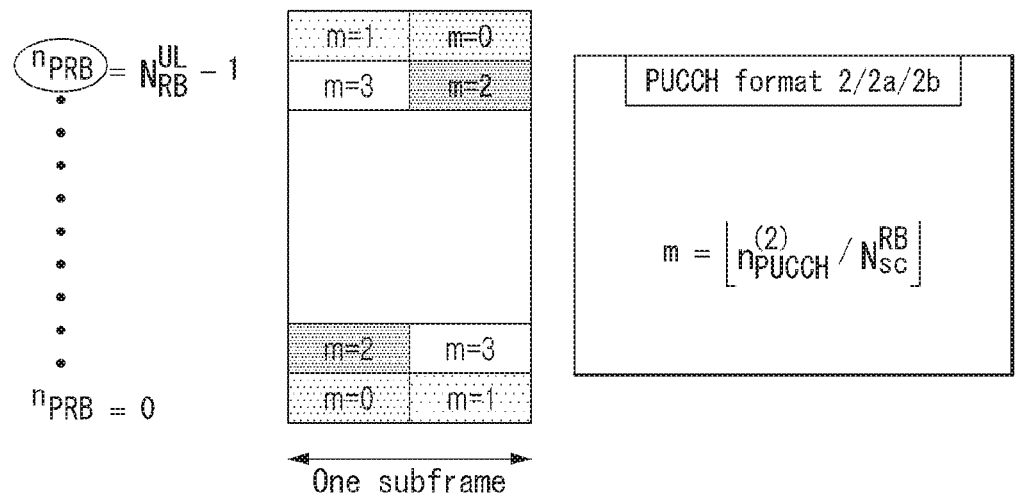

☐ PRBs used for transmission of PUCCH in slot $n_s$ $$n_{PRB} = \begin{cases} \left\lfloor \dfrac{m}{2} \right\rfloor & if (m + n_s \bmod 2) \bmod 2 = 0 \\ N_{RB}^{UL} - 1 - \left\lfloor \dfrac{m}{2} \right\rfloor & if (m + n_s \bmod 2) \bmod 2 = 1 \end{cases}$$

- Mapping sequence
    From RBs in outside boundary
    From RBs in inside boundary
- PUCCH format 2/2a/2b priority
- ACK/NACK and CQI format mixed subsequently
- PUCCH format 1/1a/1b PUCCH format 2/2a/2b $$m = \left\lfloor n_{PUCCH}^{(2)} / N_{sc}^{RB} \right\rfloor$$

PUCCH format 1/1a/1b $$m = \begin{cases} N_{RB}^{(2)} & if\ n_{PUCCH}^{(1)} < c \cdot N_{cs}^{(1)} / \Delta_{shift}^{PUCCH} \\ \left\lfloor \dfrac{n_{PUCCH}^{(1)} - c \cdot N_{cs}^{(1)} / \Delta_{shift}^{PUCCH}}{c \cdot N_{cs}^{RB} / \Delta_{shift}^{PUCCH}} \right\rfloor + N_{RB}^{(2)} + \left\lceil \dfrac{N_{cs}^{(2)}}{8} \right\rceil & otherwise \end{cases}$$

$$c = \begin{cases} 3 & \text{Standard CP} \\ 2 & \text{Extended CP} \end{cases}$$

FIG. 14
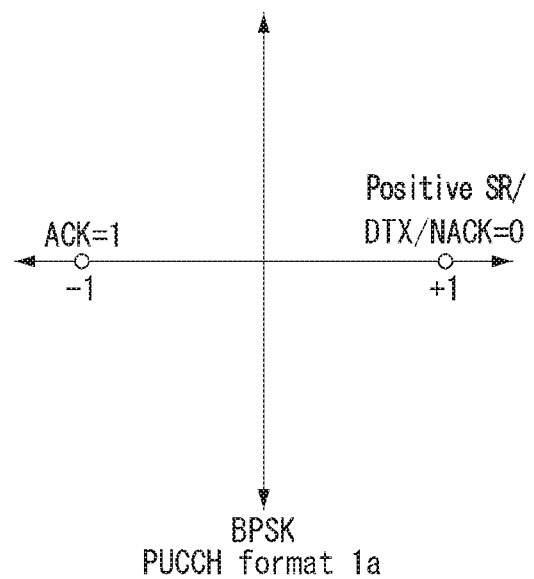
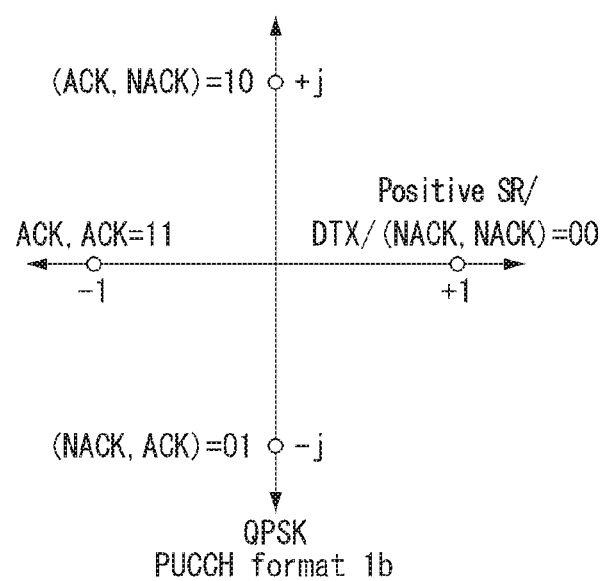

R/R/E/LCID sub-header

FIG. 17
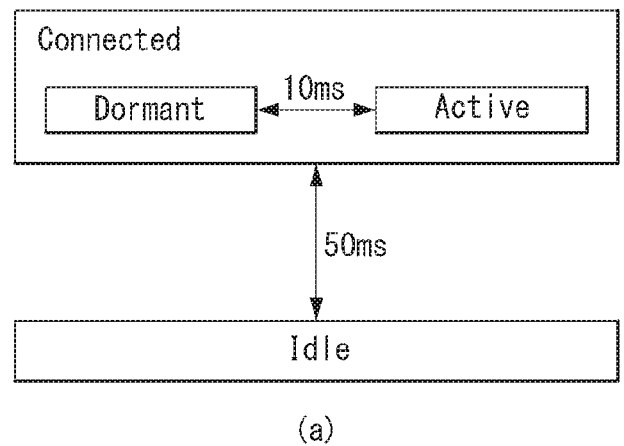
(a)
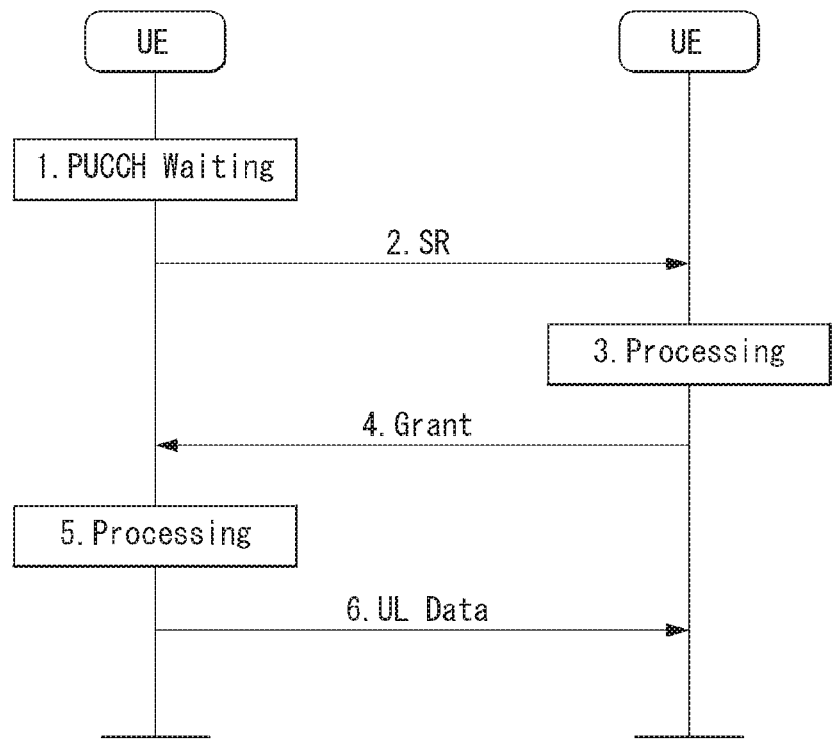
(b)

FIG. 18
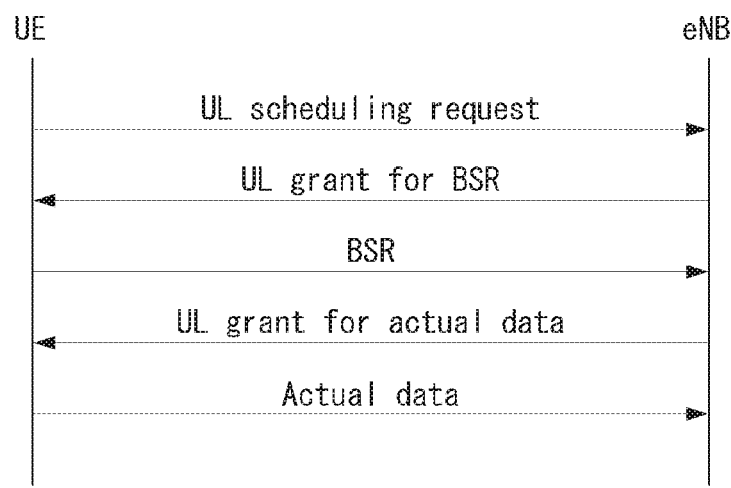
(a)
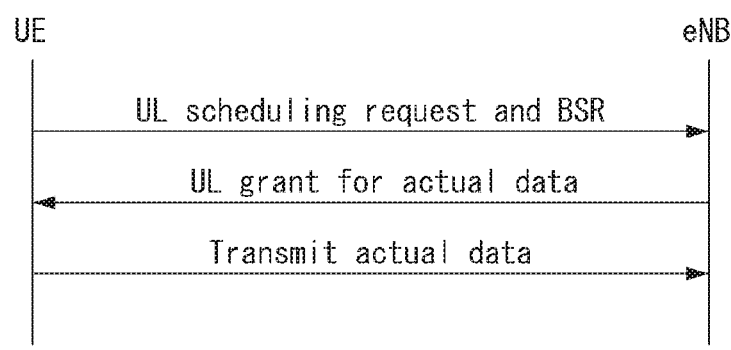
(b)

FIG. 21
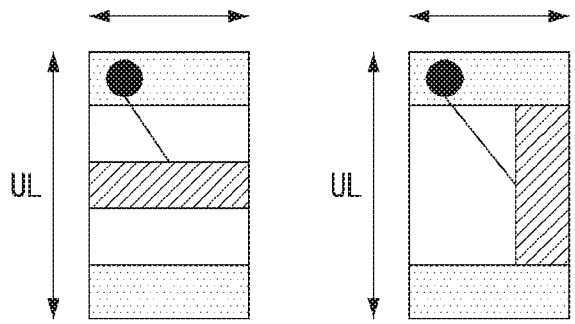
(a)
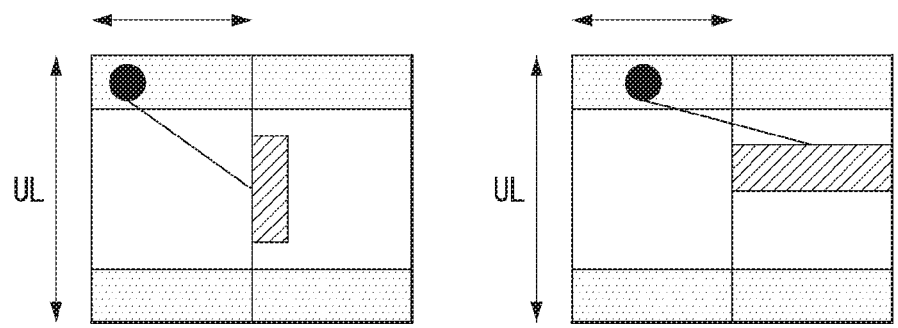
(b)
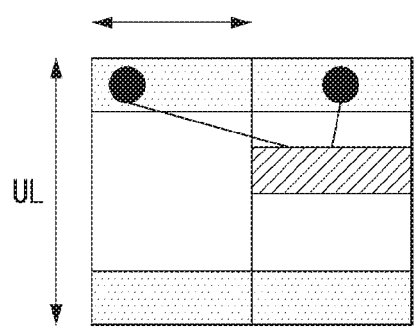
● SR ☐ PUCCH ▨ UL contention zone for BSR
(c)

FIG. 22
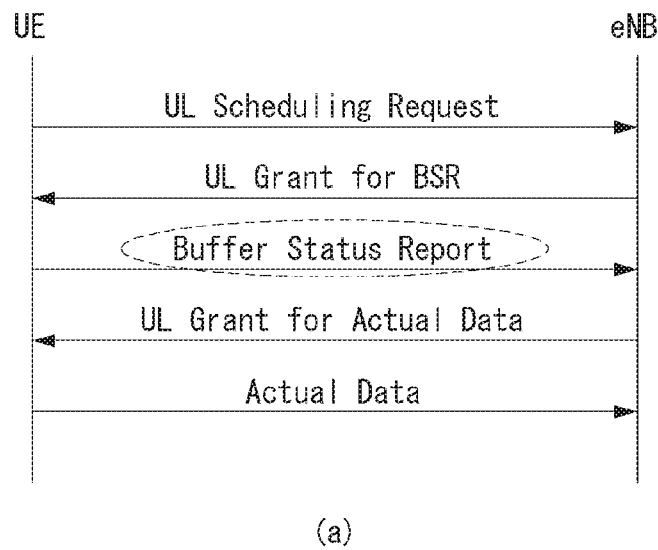
(a)
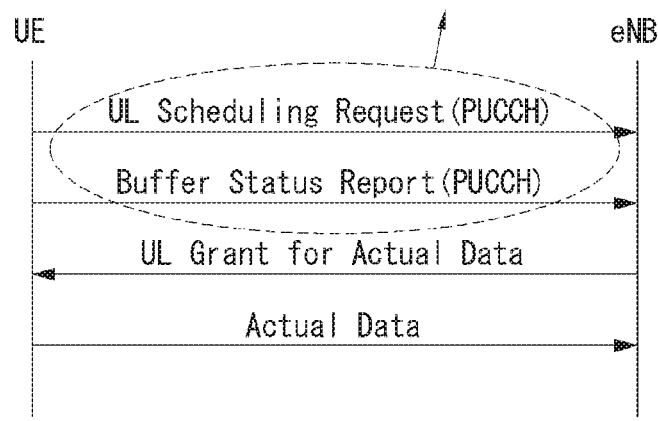
(b)

FIG. 23
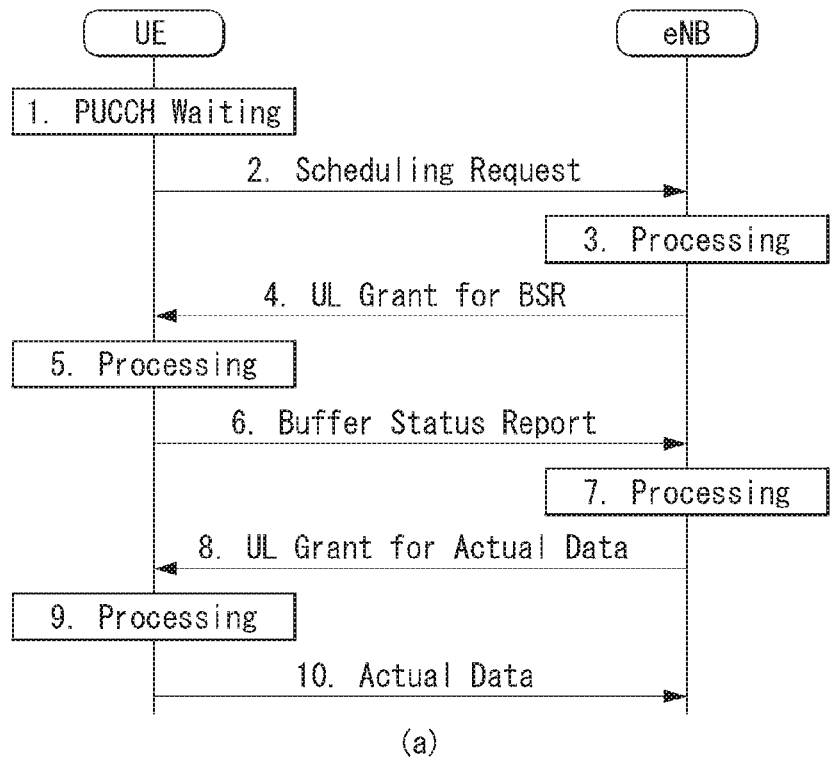
(a)
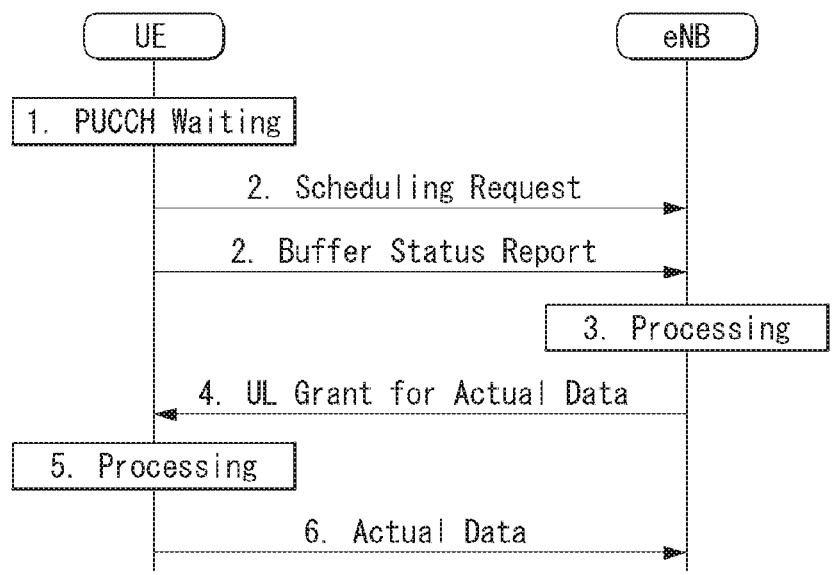
(b)

FIG. 24
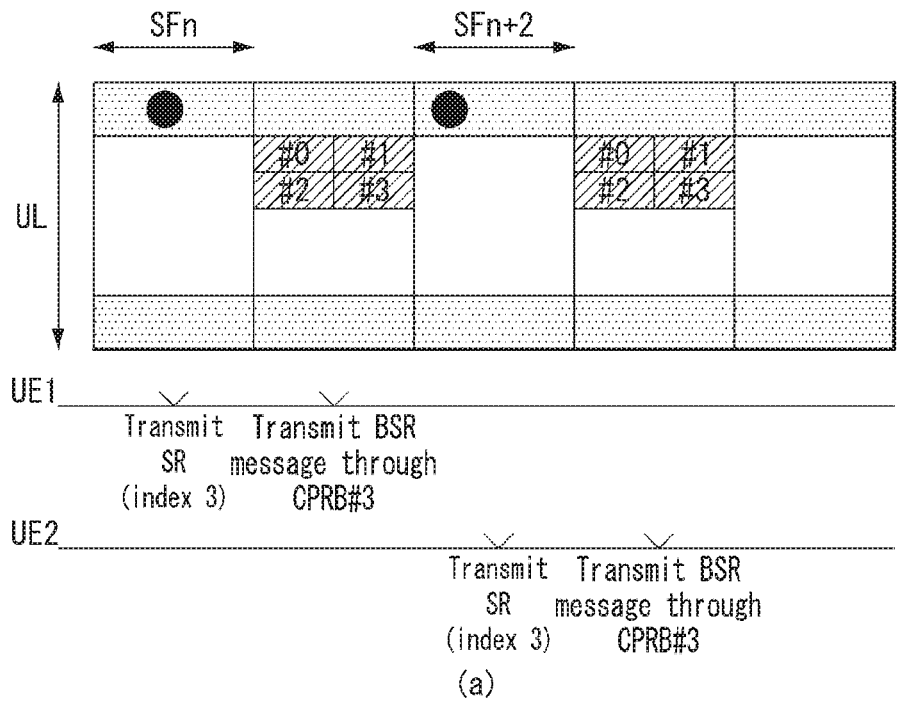
(a)
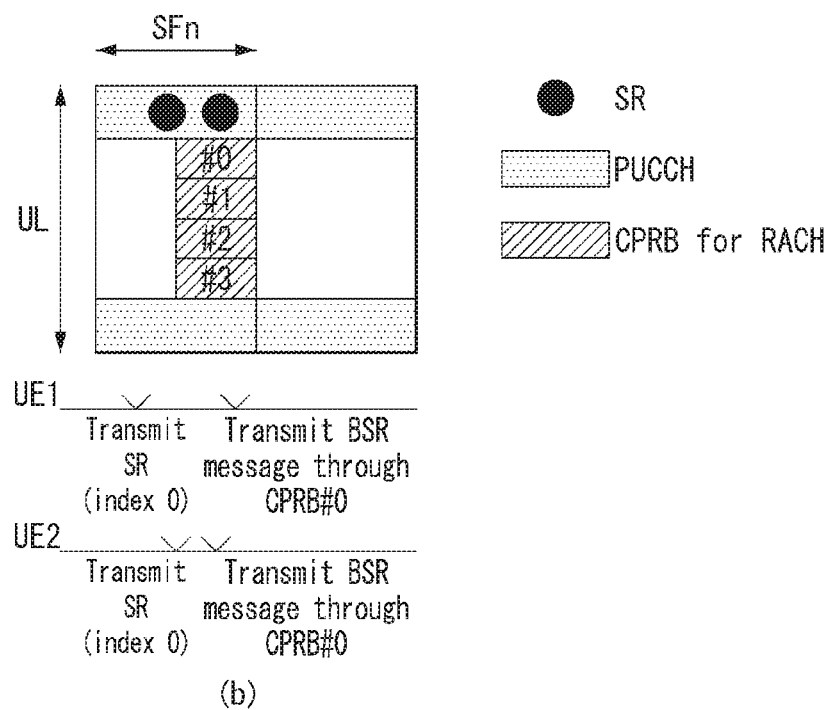
(b)

FIG. 33
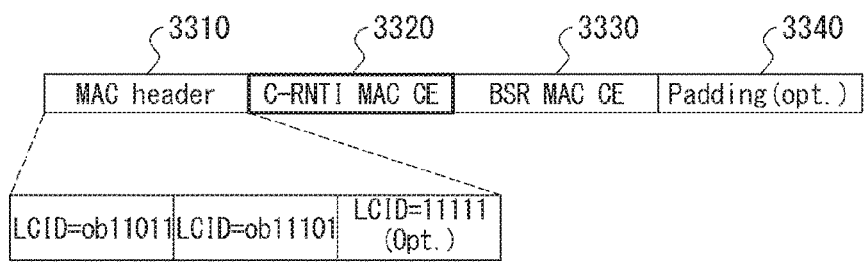
(a)
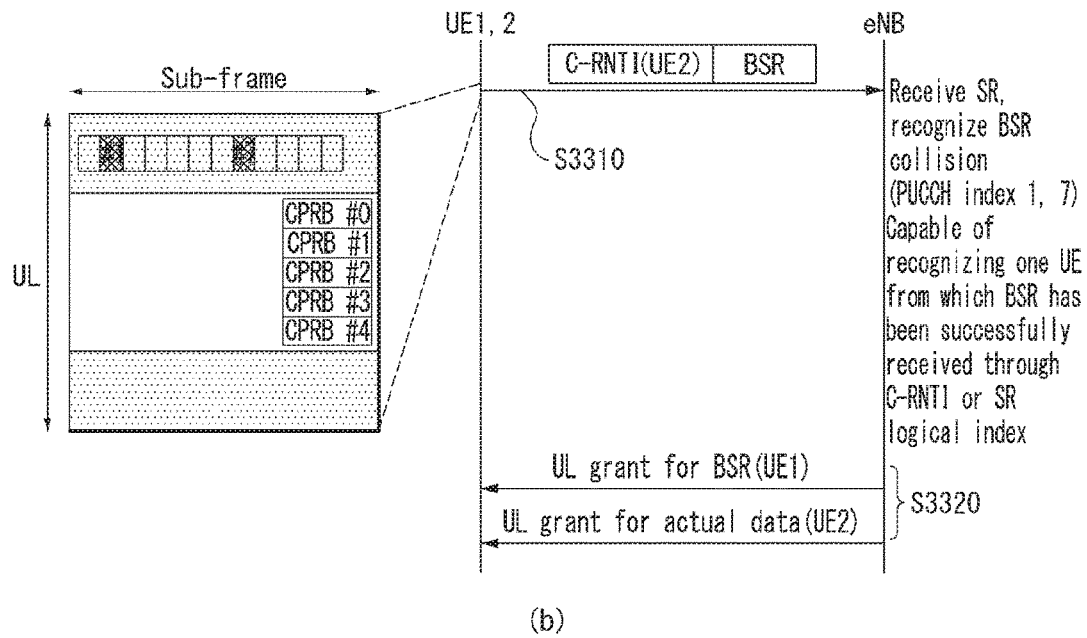
(b)

FIG. 34
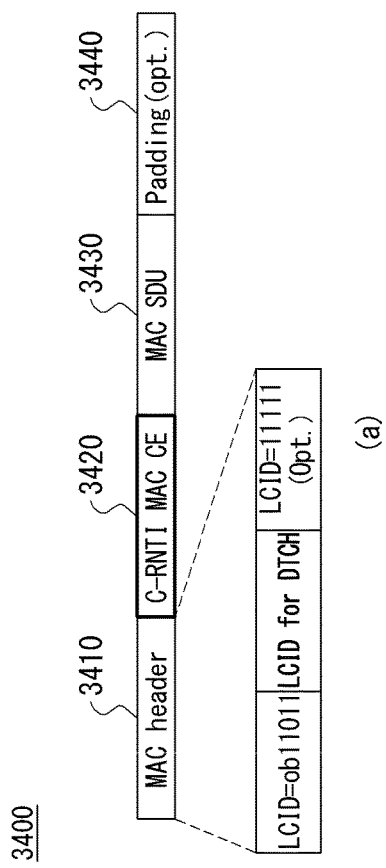
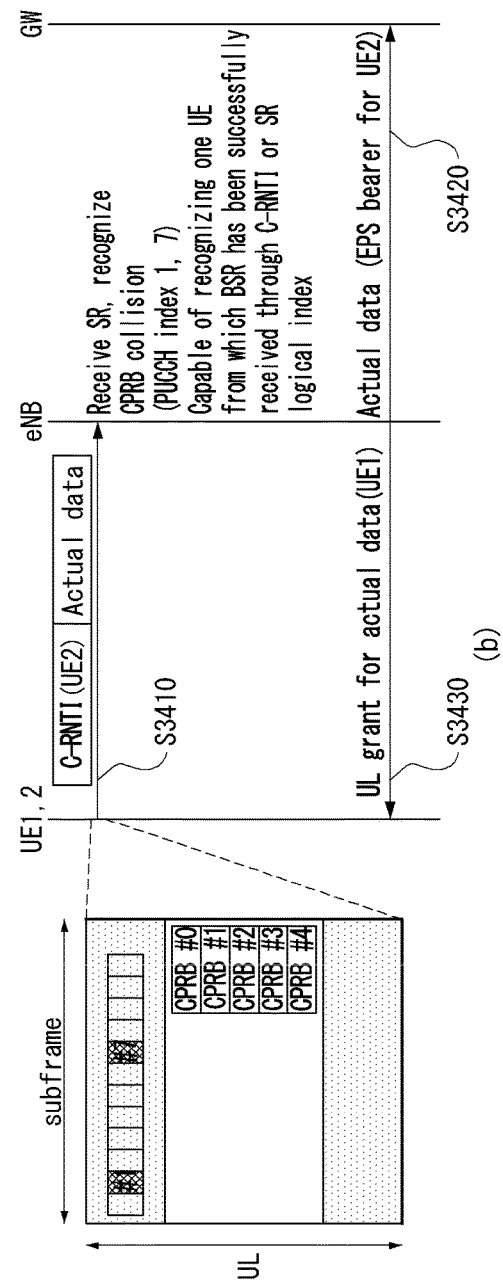

FIG. 35
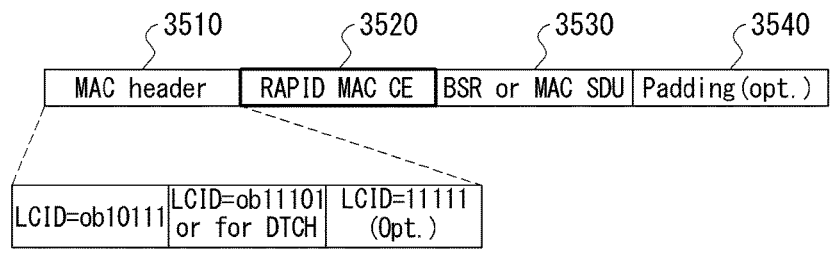
(a)
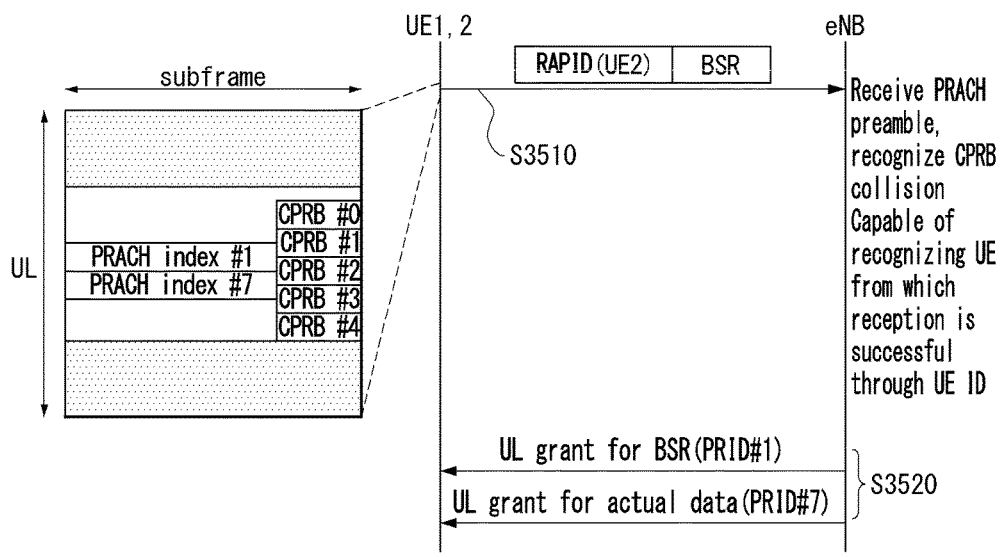
(b)

METHOD FOR TRANSMITTING AND RECEIVING UPLINK DATA USING CONTENTION BASED RESOURCES IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2015/010172, filed on Sep. 25, 2015, which claims the benefit of U.S. Provisional Application No. 62/153,525, filed on Apr. 28, 2015, the contents of which are all hereby incorporated by reference herein in their entirety.

TECHNICAL FIELD

The present invention relates to a wireless communication system and, more particularly, to a method of transmitting a scheduling request (SR) using contention-based resources and an apparatus for the same.

BACKGROUND ART

Wireless communication systems are widely deployed to provide a variety of types of communication services such as voice and data. In general, a wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system and so on.

DISCLOSURE

Technical Problem

The present invention is to provide a method capable of recognizing, by a BS, a specific UE although a collision is generated in a contention resource because UE recognizer information is included in an MAC PDU and transmitted.

Technological objects to be achieved by the present invention are not limited to the aforementioned objects, and other objects that have not been described may be taken into consideration by a person having ordinary skill in the art to which the present invention pertains from the embodiments of the present invention.

Technical Solution

In this specification, a method for transmitting a medium access control protocol data unit (MAC PDU) in a wireless communication system is performed by a user equipment (UE) and includes the steps of transmitting a control signal to a base station through a physical uplink channel and transmitting the MAC PDU including UE recognizer information for identifying the UE to the base station using a contention resource within a contention based PUSCH (CP) zone. The CP zone is a resource region in which UL data can be transmitted without allocating an uplink grant (UL grant), the MAC PDU includes an MAC header and an MAC control element (CE), the UE recognizer information is included in the MAC CE, and the MAC header includes a logical channel identification (LCID) value indicative of the UE recognizer information.

Furthermore, in this specification, the physical uplink channel is a physical uplink control channel (PUCCH) or a physical random access channel (PRACH).

Furthermore, in this specification, the control signal is a scheduling request (SR) if the physical uplink channel is the PUCCH, and the control signal is a PRACH preamble sequence if the physical uplink channel is the PRACH.

Furthermore, in this specification, the UE recognizer information is a cell-radio network temporary identifier (C-RNTI), a random access preamble identifier (RAPID) or an SR logical index.

Furthermore, in this specification, the contention resource is a contention based PUSCH resource block (CPRB).

Furthermore, in this specification, the contention resource is determined based on at least one of a resource related to a scheduling request (SR) or the UE recognizer information.

Furthermore, in this specification, the MAC PDU is an MAC PDU including a buffer status report (BSR), an MAC PDU including actual data or an MAC PDU including an RRC message.

Furthermore, in this specification, the MAC PDU is transmitted simultaneously with the control signal or transmitted after one subframe (SF) from the transmission of the control signal.

Furthermore, in this specification, the contention resource is based on the index of a resource for a scheduling request (SR).

Furthermore, in this specification, the index of the resource for the scheduling request (SR) is the physical index or logical index of an uplink resource in which the SR is transmitted.

Furthermore, in this specification, a user equipment for transmitting a medium access control protocol data unit (MAC PDU) in a wireless communication system includes a radio frequency (RF) unit for transmitting/receiving a radio signal and a processor. The processor controls the RF unit so that a control signal is transmitted to a base station through a physical uplink channel and the MAC PDU including UE recognizer information for identifying the UE is transmitted to the base station using a contention resource within a contention based PUSCH (CP) zone. The CP zone is a resource region in which UL data can be transmitted without allocating an uplink grant (UL grant). The MAC PDU includes an MAC header and an MAC control element (CE). The UE recognizer information is included in the MAC CE. The MAC header includes a logical channel identification (LCID) value indicative of the UE recognizer information.

Advantageous Effects

In accordance with the embodiments of the present invention, there are the following effects.

First, a UE can transmit an SR and subsequent data efficiently.

Second, a UE can perform SR transmission over a network without a collision with another UE.

Third, if a collision with another UE is generated, an UL grant can be received and UL data can be transmitted.

Furthermore, this specification has effects in that a BS can recognize a specific UE although a collision is generated in a contention resource because UE recognizer information is included in an MAC PDU and transmitted and thus system performance can be improved because an UL grant can be transmitted.

Effects which may be obtained by the embodiments of the present invention are not limited to the aforementioned effects, and other effects not described above may be evidently derived and understood by a person having ordinary skill in the art to which the present invention pertains from the following description of the embodiments of the present invention. That is, unwanted effects according to the practice of the present invention may be derived by a person having ordinary skill in the art from the embodiments of the present invention.

DESCRIPTION OF DRAWINGS

The accompanying drawings included as part of a detailed description in order to help understanding regarding the present invention provide various embodiments of the present invention. Furthermore, the accompanying drawings are used to describe the embodiments of the present invention along with the detailed description.

FIG. 2 shows the structure of the control plane and user plane of a radio interface protocol between a UE and an E-UTRAN based on 3GPP radio access network standard.

FIG. 11 is a diagram illustrating ACK/NACK channelization for the PUCCH formats 1a and 1b.

FIG. 12 is a diagram showing channelization for a mixed structure of the PUCCH formats 1a/1b and formats 2/2a/2b within the same PRB.

FIG. 13 is a diagram showing PRB allocation.

FIG. 14 illustrates a method of multiplexing ACK/NACK and an SR.

FIG. 17 shows a procedure for transition from a dormant state to an active state.

FIG. 18 shows an SR procedure that is an embodiment of the present invention.

FIG. 21 is a diagram for illustrating a CP zone for a BSR according to an embodiment of the present invention.

FIG. 22 is a diagram for illustrating a comparison between SR procedures depending on whether a CP zone has been configured.

FIG. 23 is a diagram for illustrating an effect if a CP zone has been configured for a BSR.

FIG. 24 shows a method of occupying a contention-based resource block based on UL physical resources according to an embodiment of the present invention.

FIGS. 33 to 35 are diagrams illustrating examples of a UE recognition method using UE recognizer information which is proposed in this specification.

MODE FOR INVENTION

Figure 1:
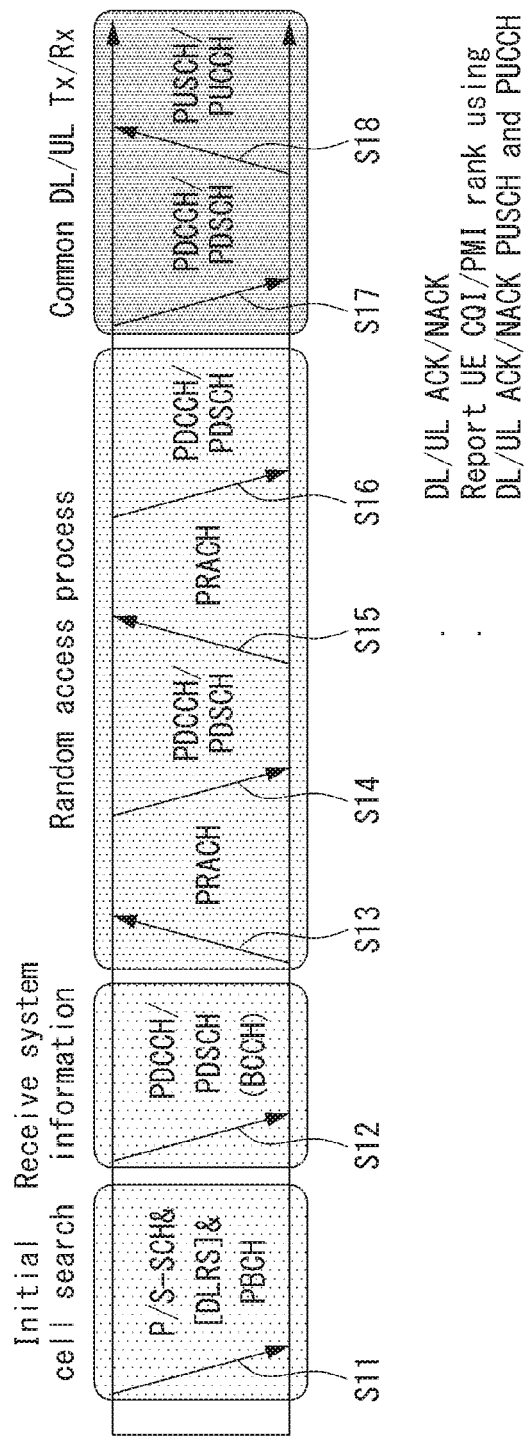
FIG. 1 is a diagram for illustrating physical channels and a signal transmission method using the same.

Embodiments of the present invention described in detail hereunder provide methods of transmitting CSI in a radio access system supporting a multi-connection mode in which a user equipment is connected to two or more small cells and apparatuses supporting the same.

The following embodiments are the results of combining the elements and characteristics of the present invention in a specific form. Each of the elements or characteristics may be considered to be optional unless separately explicitly described otherwise. Each of the elements or characteristics may be implemented in a form not combined with another element or characteristic. Furthermore, some elements and/or characteristics may be combined to form an embodiment of the present invention. The sequence of operations described in the embodiments of the present invention may be changed. Some elements or characteristics of a specific embodiment may be included in another embodiment or may be substituted with the corresponding elements or characteristics of another embodiment.

In the description of the drawings, a procedure or step that may make the gist of the present invention vague has not been described and a procedure or step that may be understood by those skilled in the art has not been described.

In the entire specification, when it is said that a part "comprises or includes" any element, it means that the part does not exclude any element, but may further include another element unless explicitly described to the contrary. Furthermore, the term " . . . unit", " . . . er (or)" or "module" described in the specification means a unit for processing at least one function or operation, and the unit may be implemented by hardware or software or a combination of hardware and software. Furthermore, "a or an", "one", "the" and similar words thereof may be used as a meaning including both singular and plural forms unless they are differently indicated in this specification or are evidently contracted in the context that describes the present invention (in particular, in the context of the claims).

In this specification, the embodiments of the present invention have been described based on a data transmission/reception relation between a BS and a mobile station. In this case, the BS has a meaning as a terminal node of a network that directly performs communication with the mobile station. In this document, a specific operation described to be performed by a BS may be performed by an upper node of the BS according to circumstance.

That is, in a network consisting of a plurality of network nodes including a BS, various operations performed for communication with a mobile station may be performed by the BS or other network nodes other than the BS. In this case, the "BS" may be substituted with a term, such as a fixed station, node B, eNode B (eNB), an advanced base station (ABS) or an access point.

Furthermore, in the embodiments of the present invention, a terminal may be substituted with a term, such as a user equipment (UE), a mobile station (MS), a subscriber station (SS), a mobile subscriber station (MSS), a mobile terminal (MT) or an advanced mobile station (AMS).

Furthermore, a transmission stage refers to a fixed and/or mobile node which provides a data service or a voice service, and a reception stage means a fixed and/or mobile node which receives a data service or a voice service. Accordingly, in uplink, a mobile station may become a transmission stage, and a BS may become a reception stage. Likewise, in downlink, a mobile station may become a reception stage and a BS may become a transmission stage.

The embodiments of the present invention may be supported by standard documents disclosed in at least one of an IEEE 802.xx system, a 3rd Generation Partnership Project (3GPP) system, a 3GPP LTE system and 3GPP2 system, that is, radio access systems. In particular, the embodiments of the present invention may be supported by 3GPP TS 36.211, 3GPP TS 36.212, 3GPP TS 36.213 and 3GPP TS 36.321 documents. That is, evident steps or portions that have not been described in the embodiments of the present invention may be described with reference to the documents. Furthermore, all of terms disclosed in this document may be described by the standard documents.

Preferred embodiments of the present invention are described in detail with reference to the accompanying drawings. A detailed description to be disclosed along with the accompanying drawings are intended to describe exemplary embodiments of the present invention and are not intended to indicate a sole embodiment of the present invention.

Furthermore, specific terms used in the embodiments of the present invention are provided to help understanding of the present invention, and such specific terms may be changed into other forms without departing from the technological spirit of the present invention.

Hereinafter, a 3GPP LTE/LTE-A system is described as an example of a radio access system in which the embodiments of the present invention may be used.

The following technologies may be applied to various radio access systems, such as code division multiple access (CDMA), frequency division multiple access (FDMA), time division multiple access (TDMA), orthogonal frequency division multiple access (OFDMA) and single carrier frequency division multiple access (SC-FDMA).

CDMA may be implemented as a radio technology, such as universal terrestrial radio access (UTRA) or CDMA2000. TDMA may be implemented as a radio technology, such as global system for mobile communications (GSM)/general packet radio service (GPRS)/enhanced data rates for GSM evolution (EDGE). OFDMA may be implemented as a radio technology, such as IEEE 802.11 (Wi-Fi), IEEE 802.16 (WiMAX), IEEE 802-20 or evolved UTRA (E-UTRA).

UTRA is part of a universal mobile telecommunications system (UMTS). 3GPP long term evolution (LTE) is part of an evolved UMTS (E-UMTS) using E-UTRA, and it adopts OFDMA in downlink and adopts SC-FDMA in uplink. An LTE-advanced (A) system is an evolved system of the 3GPP LTE system. In order to clarify the description of the technological characteristics of the present invention, the embodiments of the present invention are described based on the 3GPP LTE/LTE-A system, but may also be applied to IEEE 802.16e/m systems, etc.

1. 3GPP LTE/LTE A system

In a radio access system, a UE receives information from a BS through downlink (DL) and transmits information to the BS through uplink (UL). The information transmitted/received by the BS and the UE includes common data information and various types of control information, and various physical channels are present depending on the type/use of information transmitted/received by the UE and the BS.

1.1 General System

FIG. 1 is a view for explaining physical channels that may be used in the embodiments of the present invention and a signal transmission method using the same.

When a UE is powered on again or when the UE newly enters a cell, the UE performs an initial cell search operation, such as synchronization with a BS, in step S11. For the initial cell search operation, the UE may receive a primary synchronization channel (P-SCH) and a secondary synchronization channel (S-SCH) from the BS so as to perform synchronization with the BS, and acquire information such as a cell ID.

Thereafter, the UE may receive a physical broadcast channel (PBCH) from the BS and acquire broadcast information in the cell.

Meanwhile, the UE may receive a downlink reference signal (DL RS) in the initial cell search step and confirm a downlink channel state.

The UE which completes the initial cell search may receive a physical downlink control channel (PDCCH) and a physical downlink shared channel (PDSCH) corresponding to the PDCCH, and obtain more detailed system information in step S12.

Thereafter, the UE may perform a random access procedure in steps S303 to S306, in order to complete the access to the BS. For the random access procedure, the UE may transmit a preamble via a Physical random access channel (PRACH) (S13), and may receive a message in response to the preamble via the PDCCH and the PDSCH corresponding thereto (S14). In contention-based random access, a contention resolution procedure including the transmission of an additional PRACH (S15) and the reception of the PDCCH and the PDSCH corresponding thereto (S16) may be performed.

The UE which performs the above-described procedure may then receive the PDCCH/PDSCH (S17) and transmit a Physical Uplink Shared channel (PUSCH)/physical uplink control channel (PUCCH) (S18), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (CQI), preceding matrix indicator (PMI), rank indication (RI), etc. In the embodiments of the present invention, CQI and/or PMI are also referred to as channel quality control information.

In general, although UCI is periodically transmitted via a PUCCH in the LTE system, this may be transmitted through a PUSCH if control information and traffic data are simultaneously transmitted. In addition, a UCI may be aperiodically transmitted via a PUSCH in response to a network request/instruction.

FIG. 2 shows the structure of the control plane and user plane of a radio interface protocol between a UE and an E-UTRAN based on 3GPP radio access network standard. The control plane means a passage through which control messages used by a user equipment (UE) and a network in order to manage a call are transmitted. The user plane means a passage through which data generated in the application layer, for example, voice data or Internet packet data are transmitted.

A physical layer, that is, a first layer, provides an information transfer service to a higher layer using a physical channel. The physical layer is connected to a medium access control (MAC) layer located on the higher side through a transport channel. Data is moved through the transport channel between the MAC layer and the physical layer. Data is moved through a physical channel between the physical layers on the transmission side and the reception side. The physical channel uses the time and frequency as radio resources. Specifically, the physical channel is modulated according to an orthogonal frequency division multiple access (OFDMA) scheme in downlink and modulated according to a single carrier frequency division multiple access (SC-FDMA) scheme in uplink.

The medium access control (MAC) layer of a second layer provides a service to a radio link control (RLC) layer, that is, a high layer, through a logical channel. The RLC layer of the second layer supports reliable data transmission. The function of the RLC layer may also be implemented as a function block within MAC. The packet data convergence protocol (PDCP) layer of the second layer performs a header compression function for reducing unnecessary control information in order to efficiently transmit an IP packet, such as IPv4 or IPv6, in a radio interface having a narrow bandwidth.

A radio resource control (RRC) layer located at the bottom of a third layer is defined only in the control plane. The RRC layer is responsible for control of a logical channel, a transport channel and a physical channel in relation to the configuration, re-configuration and release of radio bearers (RBs). The RB means a service provided by the second layer for the transfer of data between a UE and a network. To this end, the RRC layers of the UE and the network exchange RRC messages.

One cell forming a base station (BS) is configured as one of bandwidths, such as 1.25, 2.5, 5, 10, 15 and 20 MHz, and provides an uplink or downlink transfer service to several UEs. Different cells may be configured to provide different bandwidths.

In a network, a downlink transport channel through which data is transmitted to a UE includes a broadcast channel (BCH) through which system information is transmitted, a paging channel (PCH) through which a paging message is transmitted, a downlink shared channel (SCH) through which user traffic or a control message is transmitted, etc. Traffic or a control message for a downlink multicast or broadcast service may be transmitted through a downlink SCH or may be transmitted through a separated downlink multicast channel (MCH).

Meanwhile, an uplink transport channel through which data is transmitted from a UE to a network includes a random access channel (RACH) through which an initial control message is transmitted and an uplink shared channel (SCH) through which user traffic or a control message is transmitted. A logical channel located over the transport channel and mapped to the transport channel includes a broadcast control channel (BCCH), a paging control channel (PCCH), a common control channel (CCCH), a multicast control channel (MCCH), a multicast traffic channel (MTCH), etc.

Figure 3:
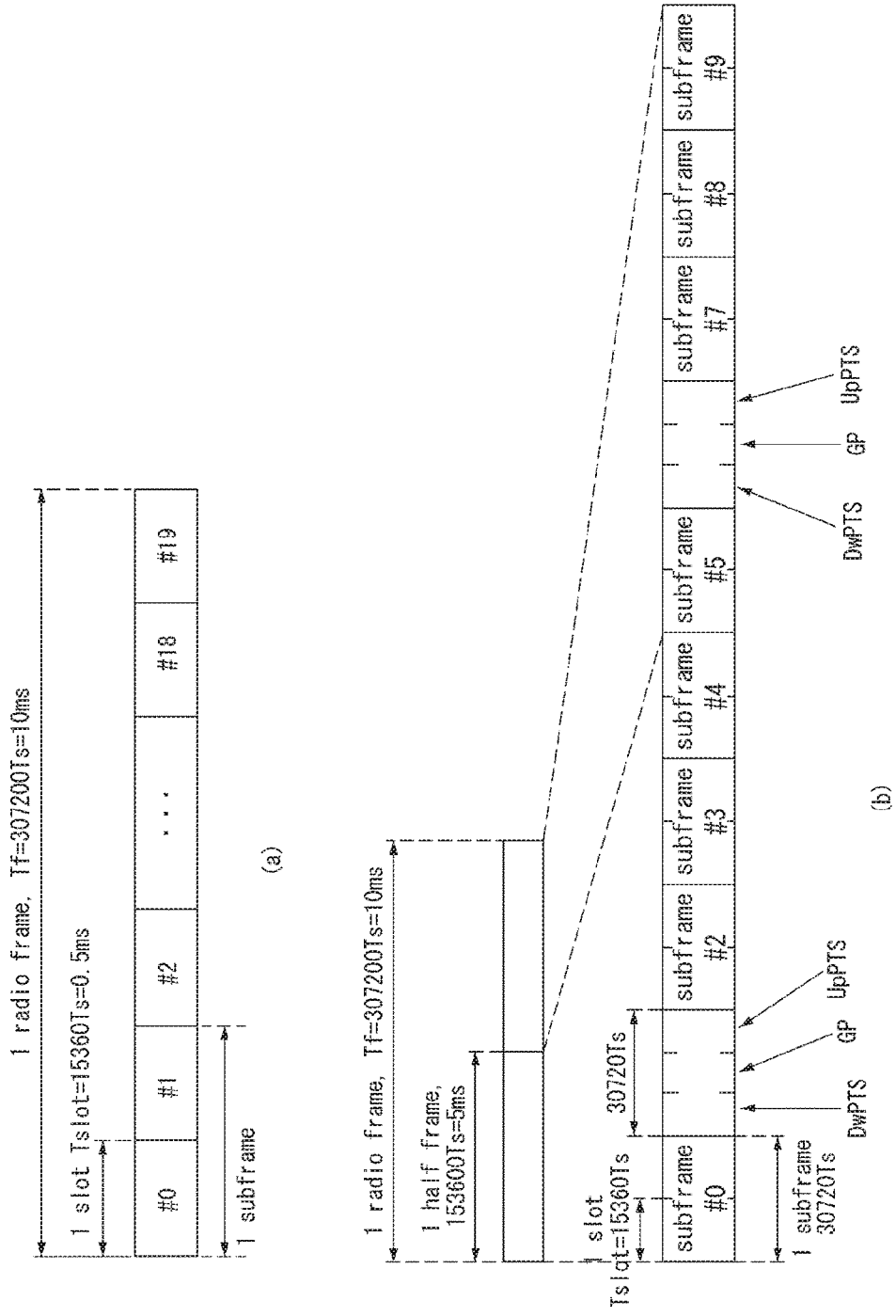
FIG. 3 is a diagram showing an example of the structure of a radio frame.

FIG. 3 shows a structure of a radio frame used in embodiments of the present invention.

In a cellular OFDM radio packet communication system, uplink/downlink data packet transmission is performed in a subframe unit and one subframe is defined as predetermined duration including a plurality of OFDM symbols. The 3GPP LTE standard supports a type-1 radio frame structure applicable to frequency division duplex (FDD) and a type-2 radio frame structure applicable to time division duplex (TDD). According to the FDD scheme, UL transmission and DL transmission are performed by occupying different frequency bandwidths. According to the TDD scheme, UL transmission and DL transmission are performed on different times while occupying the same frequency bandwidth. Channel responses in the TDD scheme are substantially reciprocal. This means that a DL channel response and an UL channel response are almost the same in a given frequency domain. Accordingly, there is an advantage in that a DL channel response can be obtained from an UL channel response in a wireless communication system based on TDD. In the TDD scheme, since a full frequency bandwidth is timely divided for UL transmission and DL transmission, the DL transmission of a BS and the UL transmission of a UE may not be performed simultaneously. In the TDD system in which UL transmission and DL transmission are distinguished for each subframe, the UL transmission and the DL transmission are performed in different subframes.

FIG. 3(a) shows the structure of a type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in the time domain and includes a plurality of resource blocks (RBs) in the frequency domain. In the 3GPP LTE system, since OFDMA is used for downlink, an OFDM symbol indicates one symbol period. The OFDM symbol may be referred to as an SC-FDMA symbol or symbol period. An RB, that is, a resource allocation unit, may include a plurality of contiguous subcarriers in one slot.

The number of OFDM symbols included in one slot may be changed depending on the configuration of a cyclic prefix (CP). The CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in the case of the normal CP. In the case of the extended CP, for example, the number of OFDM symbols included in one slot may be 6. If a channel state is unstable, such as a case where a UE moves at a high speed, the extended CP may be used to further reduce inter-symbol interference.

In the case of the normal CP, one subframe includes 14 OFDM symbols because one slot includes seven OFDM symbols. In this case, a maximum of the three first OFDM symbols of each subframe may be allocated to a physical downlink control channel (PDCCH) and the remaining OFDM symbols may be allocated to a physical downlink shared channel (PDSCH).

FIG. 3(b) shows the structure of a type-2 radio frame. The type-2 radio frame includes two half frames and each half frame includes five subframes, a downlink pilot time slot (DwPTS), a guard period (GP) and an uplink pilot time slot (UpPTS). Each of the five subframes includes two slots. The DwPTS is used for the initial cell search, synchronization or channel estimation of a UE. The UpPTS is used for the channel estimation of a BS and the uplink transmission synchronization of a UE. The GP is used to eliminate interference generated in uplink due to the multi-path delay of a downlink signal between uplink and downlink.

The structure of the radio frame is only exemplary and the number of subframes included in a radio frame, the number of slots included in a subframe or the number of symbols included in a slot may be variously changed.

Figure 4:
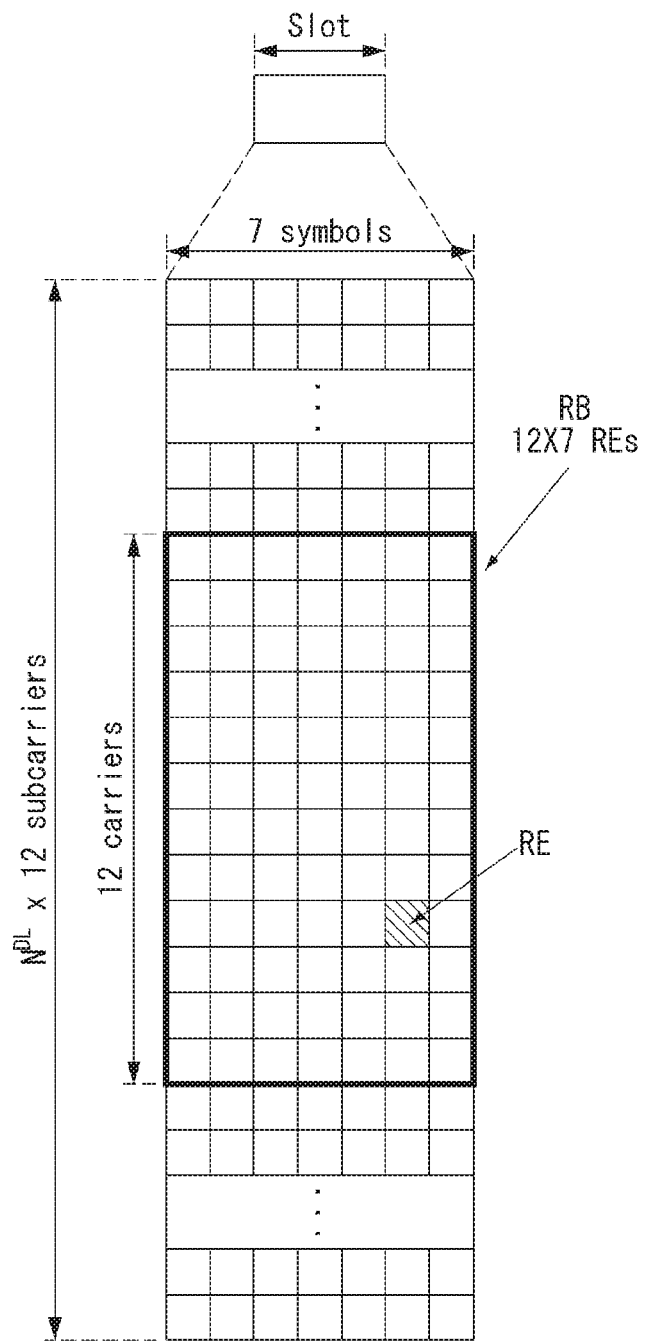
FIG. 4 is a diagram illustrating a resource grid for a downlink slot.

FIG. 4 is a diagram illustrating a resource grid for a downlink slot.

Referring to FIG. 4, one downlink slot includes a plurality of OFDM symbols in the time domain. In this case, one downlink slot is illustrated as including seven OFDM symbols, and one resource block is illustrated as including twelve subcarriers in the frequency domain, but is not limited thereto.

Each element on the resource grid is called a resource element, and one resource block includes 12×7 resource elements. The number NDL of resource blocks included in a downlink slot depends on a downlink transport bandwidth. The structure of an uplink slot may be the same as that of a downlink slot.

Figure 5:
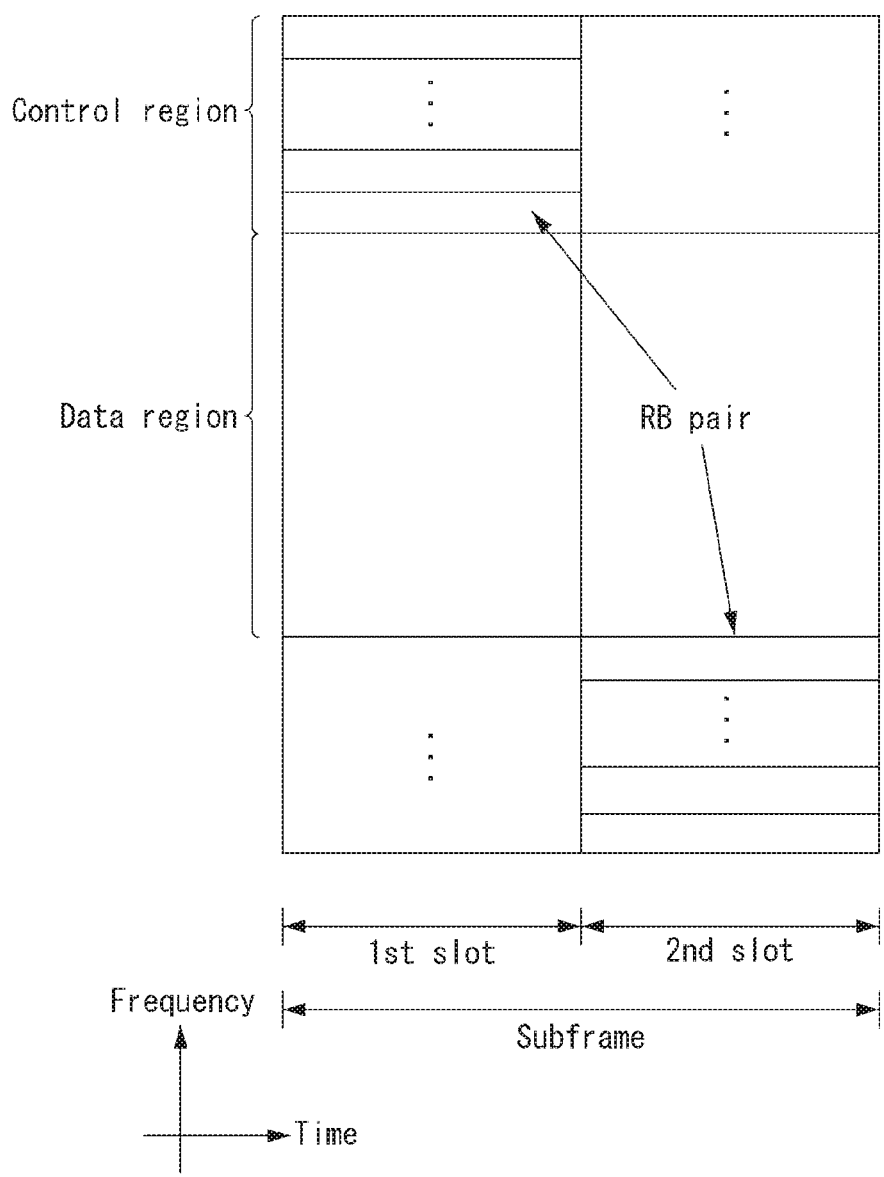
FIG. 5 is a diagram showing an example of the structure of an uplink subframe.

FIG. 5 is a diagram showing an example of the structure of an uplink subframe.

Referring to FIG. 5, the uplink subframe may be divided into a control region and a data region in the frequency domain. A PUCCH that carries uplink control information is allocated to the control region. A PUSCH that carries user data is allocated to the data region. In order to maintain a single carrier characteristic, one UE does not transmit a PUCCH and a PUSCH at the same time. An RB pair within a subframe is allocated to a PUCCH for one UE. The RBs belonging to the RB pair occupy different subcarriers in two slots, respectively. It is said that an RB pair allocated to a PUCCH is subjected to frequency hopping in a slot boundary.

Figure 6:
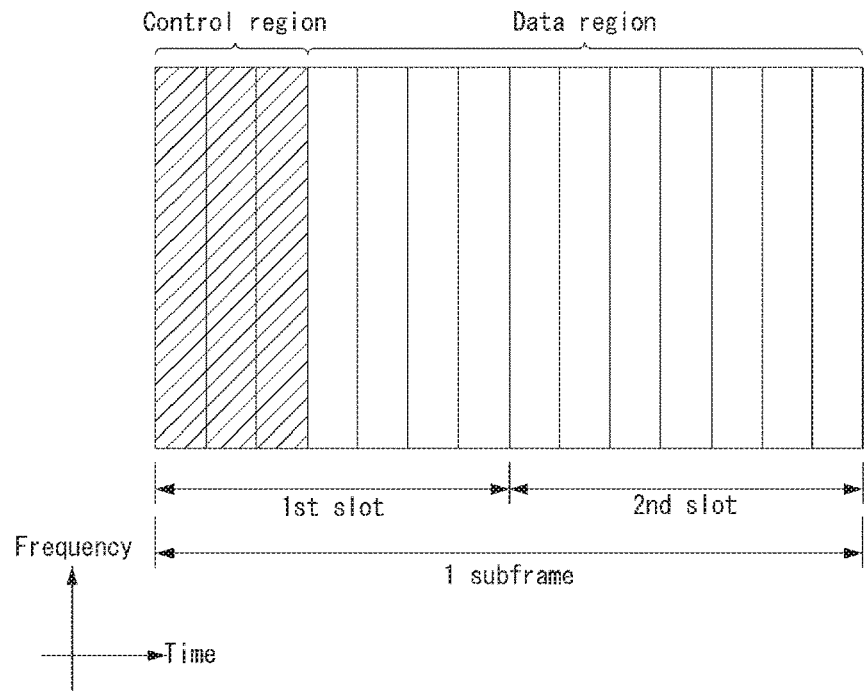
FIG. 6 is a diagram showing an example of the structure of a downlink subframe.

FIG. 6 shows a structure of a downlink subframe used in embodiments of the present invention.

Referring to the FIG. 6, a maximum of three OFDM symbols in the first slot of a subframe becomes a control region to which control channels are allocated. The remaining OFDM symbols become a data region to which physical downlink shared channels (PDSCHs) are allocated. Examples of downlink control channels used in 3GPP LTE include a physical control format indicator channel (PCFICH), a physical downlink control channel (PDCCH) and a physical hybrid-ARQ indicator channel (PHICH).

The PCFICH is transmitted in the 1st OFDM symbol of a subframe and carries information about the number of OFDM symbols (i.e., the size of the control region) used for the transmission of control channels in the subframe. That is, the PHICH is a response channel for uplink and carries an acknowledgement signal (e.g., acknowledgement (ACK)/negative-acknowledgement (NACK)) for a hybrid automatic repeat request (HARQ). Control information transmitted through a PDCCH is referred to as downlink control information (DCI). The DCI includes uplink resource assignment information, downlink resource assignment information or an uplink Tx power control command for a specific UE groups.

1.2 PUCCH (Physical Uplink Control Channel)

A PUCCH includes the following formats in order to transmit uplink control information.

(1) Format 1: used for on-off keying (OOK) modulation and a scheduling request (SR)

(2) Format 1a and Format 1b: used for ACK/NACK transmission

1) Format 1a: BPSK ACK/NACK for one codeword

Figure 7:
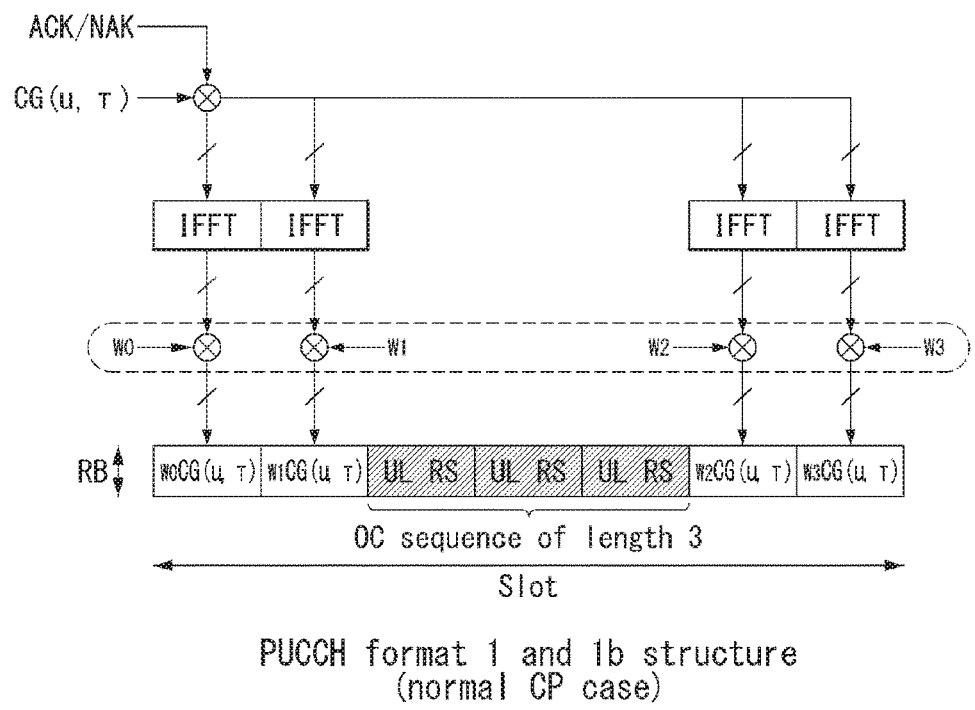
FIG. 7 shows the PUCCH formats 1a and 1b in the case of a normal cyclic prefix and FIG. 8 shows the PUCCH formats 1a and 1b in the case of an extended cyclic prefix.
Figure 8:
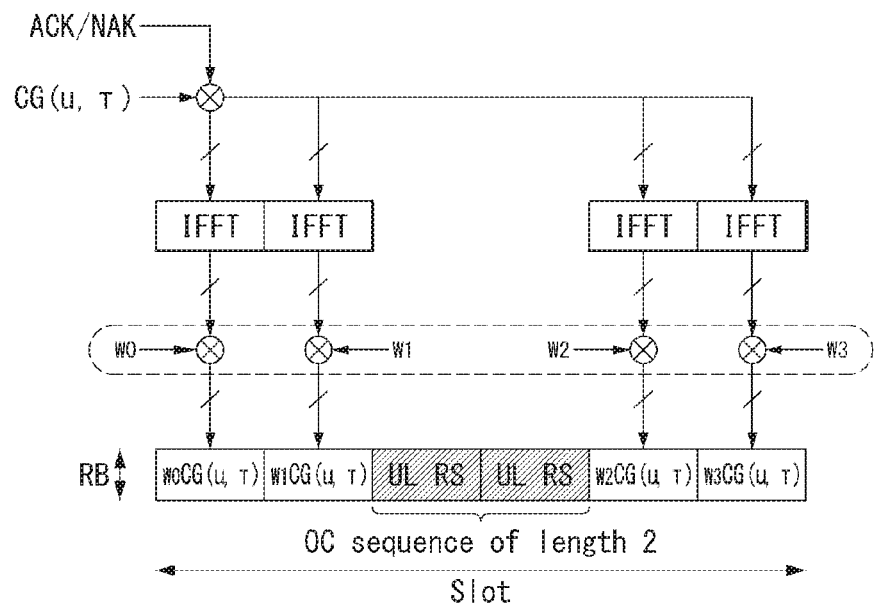

2) Format 1b: QPSK ACK/NACK for two codewords (3) Format 2: used for QPSK modulation and CQI transmission (4) Format 2a and Format 2b: used for a CQI and ACK/NACK simultaneous transmission (5) Format 3: used for plural ACK/NACK transmission in a carrier aggregation (CA) environment FIG. 7 shows the PUCCH formats 1a and 1b in the case of a normal cyclic prefix and FIG. 8 shows the PUCCH formats 1a and 1b in the case of an extended cyclic prefix.

In the PUCCH formats 1a and 1b, control information of the same contents is repeated within a subframe in a slot unit. In each UE, an ACK/NACK signal is transmitted through different resources consisting of different cyclic shifts (CSs) (frequency domain code) and orthogonal cover/orthogonal cover code (OC/OCC) (time domain spread code) of a computer-generated constant amplitude zero auto correlation (CG-CAZAC) sequence. The OC includes Walsh/DFT orthogonal code, for example. If the number of CSs is 6 and the number of OCs is 3, a total of 18 UEs may be multiplexed within the same physical resource block (PRB) on the basis of a single antenna. Orthogonal sequences w0, w1, w2 and w3 may be applied in a specific time domain (after FFT modulation) or a specific frequency domain (prior to FFT modulation).

For an SR and persistent scheduling, an ACK/NACK resource consisting of CS, OC and a physical resource block (PRB) may be provided to a UE through radio resource control (RRC). For dynamic ACK/NACK and non-persistent scheduling, an ACK/NACK resource may be implicitly provided to a UE by the lowest CCE index of a PDCCH corresponding to a PDSCH.

Figure 9:
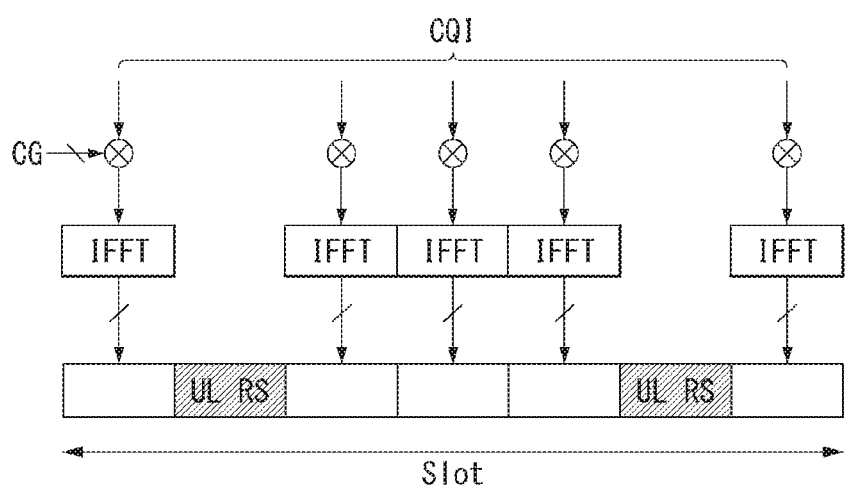
FIG. 9 shows the PUCCH formats 2/2a/2b in the case of a normal cyclic prefix and FIG. 10 shows the PUCCH formats 2/2a/2b in the case of an extended cyclic prefix.
Figure 10:
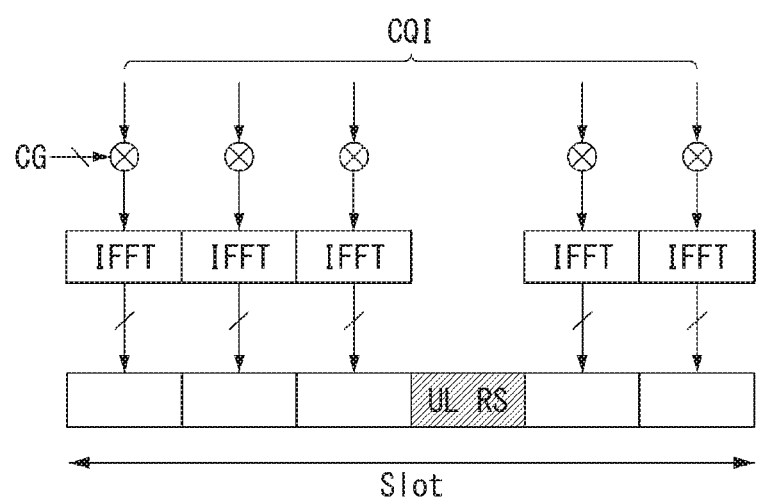

Furthermore, FIG. 9 shows the PUCCH formats 2/2a/2b in the case of a normal cyclic prefix and FIG. 10 shows the PUCCH formats 2/2a/2b in the case of an extended cyclic prefix.

FIG. 11 is a diagram illustrating ACK/NACK channelization for the PUCCH formats 1a and 1b.

Figure 12:
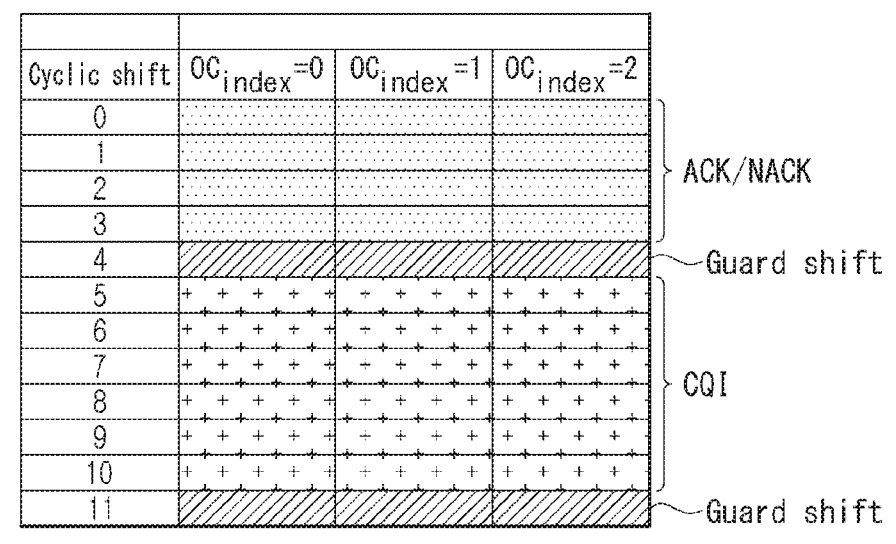

FIG. 12 is a diagram showing channelization for a mixed structure of the PUCCH formats 1a/1b and formats 2/2a/2b within the same PRB.

FIG. 13 is a diagram showing PRB allocation. As shown in FIG. 13, the PRB may be used for PUCCH transmission in a slot ns.

2. SR transmission in LTE/LTE-A system

A scheduling request (SR) is a signal for a UE to request scheduling from a BS if the UE has UL data to be transmitted. A PUCCH resource is allocated for the SR transmission of the UE, and the SR transmission is performed according to an on-off keying (OOK) scheme. For example, a UE uses a PUCCH resource only when it transmits an SR and does not use a PUCCH resource if it does not transmit an SR.

The BS that has received the SR from the UE transmits an UL grant, including scheduling information, to the UE through a PDCCH so that PUSCH transmission is performed. The transmission of the SR is configured to be performed in a specific subframe through a specific periodicity and subframe offset. Accordingly, if the UE has not received UL grant for an SR from the BS in the SR subframe of next periodicity, the UE transmits an SR to the BS again.

For the transmission of the SR, the UE receives a configuration index parameter (ISR) indicative of an SR configuration index through high layer signaling. An SR transmission periodicity parameter (SRPERIODICITY) indicative of periodicity in which an SR is transmitted and an SR subframe offset (NOFFSET,SR) indicative of a subframe in which the SR is transmitted may be configured by the configuration index parameter. That is, the SR is transmitted in a specific subframe periodically repeated according to the ISR given by a high layer. Table 1 shows SR transmission periodicity and SR subframe offsets according to SR configuration indices.

TABLE 1

| SR configuration Index $I_{SR}$ | SR periodicity (ms) $SR_{periodicity}$ | SR subframe offset $NO_{FFSET,SR}$ |
|---|---|---|
| 0-4 | 5 | ISR |
| 5-14 | 10 | $I_{SR}$-5 |
| 15-34 | 20 | $I_{SR}$-15 |
| 35-74 | 40 | $I_{SR}$-35 |
| 75-154 | 80 | $I_{SR}$-75 |
| 155-156 | 2 | $I_{SR}$-155 |
| 157 | 1 | $I_{SR}$-157 |

FIG. 14 illustrates a method of multiplexing ACK/NACK and an SR.

The structure of an SR PUCCH format 1 is the same as that of the ACK/NACK PUCCH format 1a/1b shown in FIG. 6. An SR uses on-off keying. Specifically, a UE transmits an SR having a modulation symbol in order to request (positive SR) a PUSCH resource. If scheduling is not requested (negative SR), a UE does not send anything. Since a PUCCH structure for ACK/NACK is reused for an SR, different PUCCH resource indices (e.g., a different cyclic time shift/orthogonal code combination) within the same PUCCH region may be allocated to the SR (format 1) or the HARQ ACK/NACK (format 1a/1b). A PUCCH resource index to be used by a UE for SR transmission is configured by UE-specific high layer signaling.

If a positive SR needs to be transmitted in a subframe in which CQI transmission has been scheduled, a UE drops CQI and transmits only an SR. Likewise, if the simultaneous transmission situation of an SR and an sounding RS (SRS) is generated, a UE drops CQI and transmits only the SR. If an SR and ACK/NACK are generated in the same subframe, a UE transmits the ACK/NACK on an SR PUCCH resource allocated for a positive SR. In the case of the negative SR, the UE transmits ACK/NACK on an allocated HARQ-ACK PUCCH resource. FIG. 13 illustrates constellation mapping for ACK/NACK and SR simultaneous transmission. Specifically, FIG. 13 illustrates that NACK (or NACK, NACK in the case of two MIMO codewords) is modulated and mapped as +1 (no RS modulation). Accordingly, the generation of discontinuous transmission (DTX) is treated as NACK.

As described above, ACK/NACK and an SR may be transmitted at the same time. For example, if a UE transmits ACK/NACK through the PUCCH formats 1/1a/1b, it transmits the ACK/NACK using a PUCCH resource reserved for the ACK/NACK in the case of a negative SR. In the case of a positive SR, a UE transmits ACK/NACK using a PUCCH resource allocated for an SR.

If a UE transmits ACK/NACK using the PUCCH format 3, an SR is subjected to joint encoding with the ACK/NACK and transmitted using a PUCCH resource designated for the PUCCH format 3.

3. Buffer Status Report (BSR)

A buffer status report (BSR) performed in the MAC layer is described in detail below. In an LTE system, for the purpose of the efficient use of uplink radio resource, a BS needs to be aware that each UE will transmit what type of data in uplink how much. Accordingly, a UE may directly transmit information about UL data to be transmitted to a BS. The BS may allocate an uplink resource to a corresponding UE based on the information. In this case, the information about the UL data transmitted from the UE to the BS is the amount of UL data stored in the buffer of the UE and called a buffer status report (hereinafter referred to as a "BSR").

A UE transmits a BSR in an MAC control element (CE) form. In a conventional LTE system, the BSR has two types, such as a short BSR and a long BSR. This is described in detail with reference to the drawing.

Figure 15:
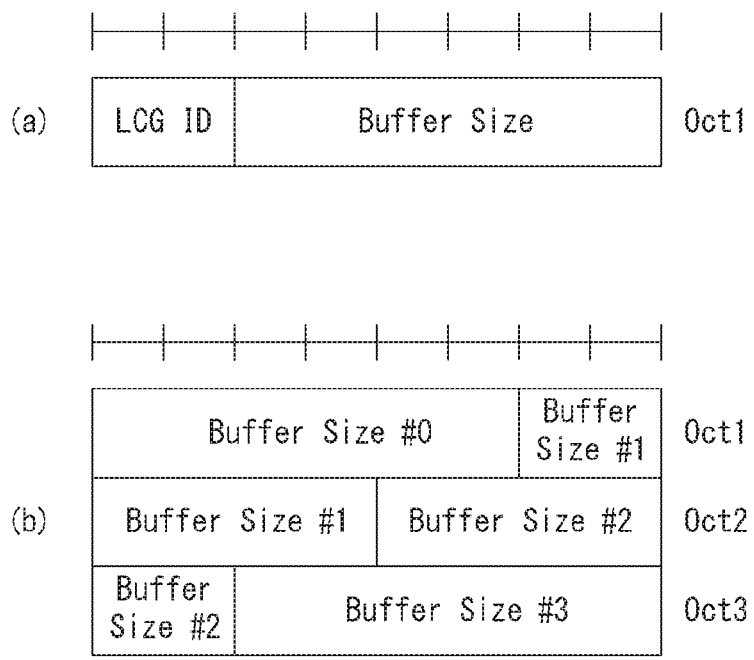
FIG. 15 is a diagram illustrating the structure of a buffer status report (BSR) defined in the LTE system.

FIG. 15 is a diagram illustrating the structure of a buffer status report (BSR) defined in the LTE system. In particular, FIG. 15(a) shows the data structure of a short BSR and FIG. 15(b) shows the data structure of a long BSR.

Referring to FIG. 15, whether a UE will select which type of the short BSR and the long BSR and transmit the selected BSR is determined based on the number of logical channel groups (LCGs) in which UL data is present. That is, if data to be transmitted is present in one LCG only, a UE transmits the short BSR. If data to be transmitted is present in two or more LCGs, a UE transmits the long BSR. In this case, the LCG is the grouping of several logical channels having similar quality of service (QoS). In a current LTE system, 4 LCGs of LCG IDs 0 to 3 are used. When a BS configures one radio bearer (RB) in a UE, the BS notifies the UE that the logical channel of the RB belongs to which LCG.

Furthermore, in the case of the short BSR, an LCG ID, that is, the ID of a logical channel group, is included in the short BSR in order to indicate that a buffer size field indicative of a buffer size corresponds to which LCG and is transmitted. In the case of the long BSR, however, buffer size fields are sequentially included in the long BSR from a logical channel group having the LCG ID of 0 to a logical channel group having the LCG ID of 3 without the ID of a logical channel group and are transmitted.

Figure 16:
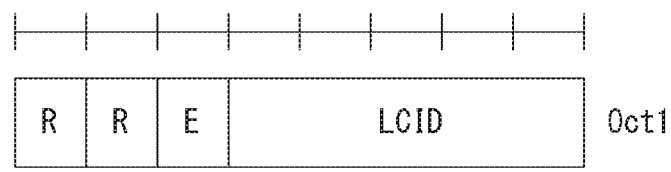
FIG. 16 is a diagram illustrating the structure of an MAC subheader defined in the LTE system.

FIG. 16 is a diagram illustrating the structure of an MAC subheader defined in the LTE system. In particular, FIG. 16 illustrates the structure of the subheader of an R/R/E/LCID type.

Referring to FIG. 16, R is a reserved bit and set to 0. Furthermore, E is an extension field and includes a flag bi indicating whether an additional field is present in an MAC header. That is, if the E is set to 1, it indicates that another subheader of the R/R/E/LCID type.

Finally, an LCID is a logical channel ID field and indicates whether a corresponding logical channel or MAC CE is present. For example, in the existing LTE system, if the LCID is set to 11101, it indicates that an MAC CE including the short BSR is present. If the LCID is set to 11110, it indicates that an MAC CE including the long BSR is present.

Meanwhile, a UE transmits a BSR to a BS when a BSR trigger condition is satisfied. In a current LTE system, a specific BSR trigger condition has been defined.

When a BSR is triggered according to a specific condition, a UE checks a buffer status, that is, a buffer size, for each LCG. In this case, the buffer size is the sum of the amount of data that waits to be transmitted in RLC and PDCP buffer in each logical channel A buffer size for one LCG means the sum of the amount of data that waits to be transmitted in the buffers of all of logical channels belonging to an LCG.

When a buffer size for each LCG is checked, the UE includes a buffer size index, corresponding to the checked buffer size, in the buffer size field of the BSR. The buffer size of the LCG is reported as one of a total of 64 ranges because the buffer size field is 6 bits.

A small cell environment to be applied to the embodiments of the present invention is defined below.

4. Small Cell Environment

A 'cell' described in the embodiments of the present invention basically includes downlink resources and may optionally include a combination of uplink resources (refer to Paragraph 2). In this case, linking between a carrier frequency for downlink resources and a carrier frequency for uplink resources is defined in system information (SI) transferred through the downlink resources.

Furthermore, the term 'cell' is coverage of a BS and means a specific frequency region or a specific geographical region. In this case, the 'cell' may be used as the same meaning as a BS supporting specific coverage for convenience of description. For example, a macro BS and a macro cell, and a small BS and a small cell may be used as the same meanings. In this case, if a cell and a BS are explicitly distinguished and used, they are used as their original meanings.

In a next-generation wireless communication system, in order to guarantee a data service, such as multimedia, more stably, there is a growing interest in the introduction of a hierarchical cell structure or heterogeneous cell structure in which a micro cell, a pico cell and/or a femto cell, that is, small cells for low energy/short-distance communication, are mixed in a macro cell-based homogeneous network. The reason for this is that the additional deployment of a macro cell with respect to the deployment of an existing BS is inefficient in terms of costs and complexity compared to system performance improvement.

A 'cell' to which the following embodiments are applied is assumed to be a small cell unless especially described to the contrary. In this case, the present invention may also be applied to a cell (e.g., a macro cell) used in a common cellular system.

Furthermore, the technological contents described in the first paragraph 1 to the third paragraph may be applied to the following embodiments described in the present invention.

Contention-based uplink transmission is described below.

A control plane (C-plane) may be basically divided into an idle mode and a connected mode. The idle mode means the state in which a UE and a BS are not connected. That is, the idle mode is the state in which RRC connection has not been performed. A UE may monitor system information and paging information broadcasted through a broadcast channel (BCH) while performing a low energy consumption operation in discontinuous reception (DRX) periodicity in the idle mode. The connected mode means the state in which a UE and a BS have been connected. That is, the connected mode may be said to be the state in which RRC connection has already been performed. Data can be transmitted or received bidirectionally because the BS and the UE are connected.

Furthermore, in order to minimize consumption power of the UE in the connected mode, a dormant state and an active state may be defined. If there is no data transmitted/received for a specific time or more in the active state in which data is actually transmitted or received, the UE switches from the active state to the dormant state and thus minimizes consumption power. In the dormant state, the UE monitors a control channel in discontinuous reception (DRX)/discontinuous transmission (DTX) periodicity. The UE in the dormant state switches to the active state in on-duration, that is, the time when a PDCCH is received, in DRX periodicity. The UE in the active state monitors a PDCCH, maintains the active state when a PDCCH is successfully decoded, and switches to the dormant state again when a PDCCH is not decoded. The dormant state and active state of the UE are managed by medium access control (MAC)/radio link control (RLC).

FIG. 17 shows a procedure for transition from the dormant state to the active state.

Latency requirements in the C-Plane in 3GPP LTE-A is described with reference to FIG. 17(a).

Referring to FIG. 17(a), 3GPP LTE-A requires that a transition time from the idle mode to the connected mode be 50 ms or less. In this case, the transition time includes the configuration time of a user plane (U-plane). Furthermore, a transition time from the dormant state to the active state within the connected mode is required to be 10 ms or less.

FIG. 17(b) shows a detailed procedure for transition from the dormant state to the active state. The transition time from the dormant state to the active state is described with reference to FIG. 17. Tables 2 and 3 are examples of the transition time from the dormant state to the active state, which is initiated by uplink.

TABLE 2

| Component | Description | Time [ms] |
|---|---|---|
| 1 | Average delay to next SR opportunity (1 ms PUCCH cycle) | 0.5 |
| 2 | UE sends Scheduling Request | 1 |
| 3 | BS decodes Scheduling Request and generates the Scheduling Grant | 3 |
| 4 | Transmission of Scheduling Grant | 1 |
| 5 | UE Processing Delay (decoding of scheduling grant + L1 encoding of UL data) | 3 |
| 6 | Transmission of UL data | 1 |
| | Total delay | 9.5 |

TABLE 3

| Component | Description | Time [ms] |
|---|---|---|
| 1 | Average delay to next SR opportunity (5 ms PUCCH cycle) | 2.5 |
| 2 | UE sends Scheduling Request | 1 |
| 3 | BS decodes Scheduling Request and generates the Scheduling Grant | 3 |
| 4 | Transmission of Scheduling Grant | 1 |
| 5 | UE Processing Delay (decoding of scheduling grant + L1 encoding of UL data) | 3 |
| 6 | Transmission of UL data | 1 |
| | Total delay | 11.5 |

Referring to Tables 2 and 3, a total transition time may be from the mean time (component 1) taken for a UE in the dormant state to wait for a subframe in which an SR can be transmitted from the time when uplink transmission is to be performed to an UL data transmission time (component 6). In Tables 2 and 3, each component corresponds to each procedure of FIG. 17. In LTE rel-8, a UE trying to switch from the dormant state to the active state first transits an SR to a BS through the PUCCH format 1. After receiving an UL grant from the BS, the UE transmits a signal indicative of the state of a buffer to the BS through a PUSCH. From Tables 2 and 3, it may be seen that the synchronized UE can switch from the dormant state to the active state within 9.5 ms or 11.5 ms. This is the transition time when periodicity in which an SR is transmitted is set as a minimum, that is, 1 ms or 5 ms. That is, if the periodicity in which an SR is transmitted is 5 ms, although the periodicity is a minimum, 10 ms or less, that is, the requirement condition of the transition time from the dormant state to the active state in LTE-A, is not satisfied. In order to overcome such a problem, contention-based uplink transmission is required.

FIG. 18 shows an SR procedure that is an embodiment of the present invention.

In the LTE system, in order to maximize the utilization of resources, an eNB scheduling-based data transmission/reception method is used. That is, in order to transmit data to a network, the UE needs to receive radio resources allocated thereto. Meanwhile, in the LTE system, for the efficient use of uplink radio resources, a BS needs to be aware that each UE will transmit which type of data in uplink how much. Accordingly, the UE may directly transmit information about UL data to be transmitted to the BS. The BS may allocate uplink resources to the corresponding UE based on the information. In this case, the information about the UL data which is transmitted from the UE to the BS is the amount of the UL data stored in the buffer of the UE and is called a buffer status report (BSR). If the UE attempts to transmit data in uplink, the UE performs a BSR on the BS in order to request radio resources for transmitting the UL data.

FIG. 18 is an embodiment of the present invention and shows a resource allocation procedure for UL data transmission. FIG. 18(a) shows a 5-step resource allocation procedure for UL data transmission, and FIG. 18(b) shows a 3-step resource allocation procedure for UL data transmission.

Referring to FIG. 18(a), at the step 1, a UE transmits a scheduling request message to a network in order to received required radio resources allocated thereto. At the step 2, the network that has received the scheduling request message from the UE transmits an UL grant to the UE through a PDCCH in order to allocate the radio resources to the UE. That is, the UE receives a transport block allocated through the radio resource for BSR transmission. At the step 3, the UE transmits the BSR to an eNB using the allocated radio resources. At the step 4, the eNB that has received the BSR allocates radio resources to the UE again based on the BSR and transmits an UL grant for actual data transmission to the UE through a PDCCH. At the step 5, the UE transmits the actual data to the eNB through the newly allocated radio resources.

Referring to FIG. 18(b), at the step 1, a UE transmits a scheduling request message for receiving required radio resources allocated thereto to a network along with a BSR. In this case, the step 2 and step 3 of FIG. 8(a) are omitted. At the step 2, a BS that has received the BSR allocates radio resource to the UE again based on the BSR and transmits an UL grant for actual data transmission to the UE through a PDCCH. At the step 3, the UE transmits the actual data to the eNB through the newly allocated radio resources.

As described above, in the LTE system, in order to maximize the utilization of resources, the eNB scheduling-based data transmission/reception method is used. This means that if a UE transmits data to an eNB, the UE first requests UL resource allocation from the eNB and can transmit the data using only the UL resources allocated by the eNB. Accordingly, in accordance with such UL data transmission, latency attributable to the resource allocation of an eNB can be increased.

There is proposed to define a contention-based PUSCH zone in order to minimize latency in the c-plane of a UE. Accordingly, a UE located in a cell in which a contention-based PUSCH zone proposed by the present invention has been configured can transmit data using the corresponding zone without the scheduling of an eNB if the UE transmits UL data that requires low latency. Meanwhile, the contention-based PUSCH zone proposed by the present invention may be limitedly used for UL data transmitted within a specific procedure (e.g., the transmission of an RRC/NAS request message for random access, the transmission of a BSR message for a BSR or the transmission of actual data). When an eNB successfully detects a contention-based PUSCH zone, the eNB may transmit an UL grant so that a corresponding UE can enter the active state. Hereinafter, a contention-based PUSCH zone (hereinafter referred to as a "CP zone") and a contention PUSCH resource block (hereinafter referred to as a "CPRB") are first described.

Definition of CP Zone and CPRB

Figure 19:
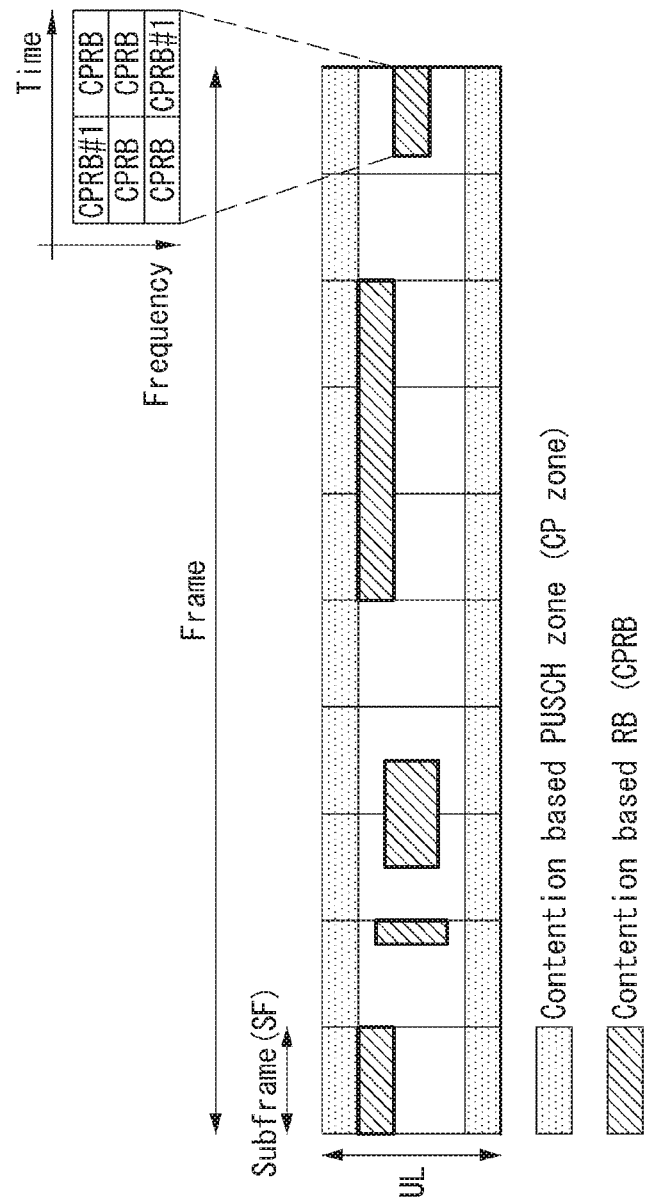
FIGS. 19 and 20 are diagrams for illustrating contention-based uplink which is related to an embodiment of the present invention.
Figure 20:
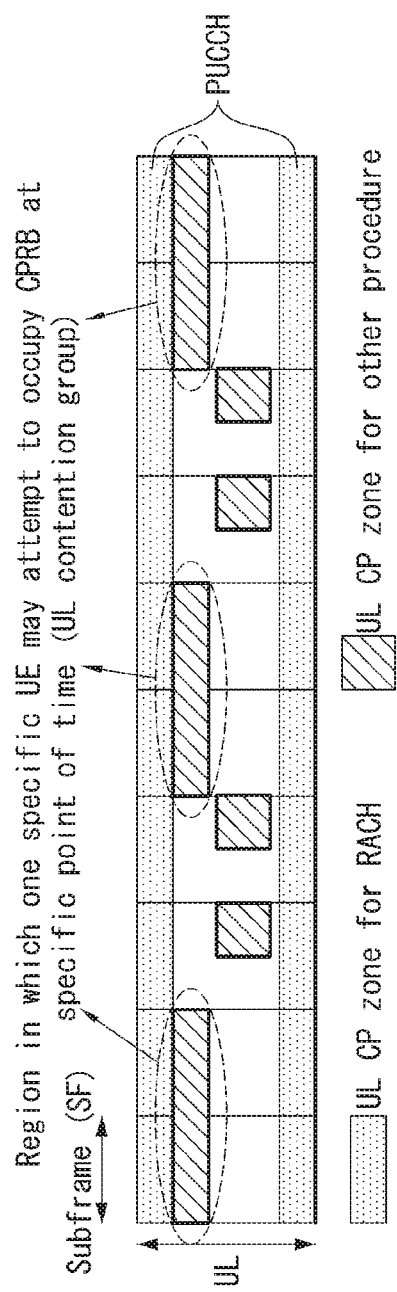

FIGS. 19 and 20 are diagrams for illustrating contention-based uplink which is related to an embodiment of the present invention.

Referring to FIG. 19, the CP zone proposed by the present invention may be allocated to a specific resource region within a PUSCH through which UL data can be transmitted. For example, the CP zone may be allocated to one subframe or contiguous subframes. Furthermore, as described above, a resource region which may be occupied by a specific one UE within a specific resource region is called a contention-based PUSCH resource block (CPRB). That is, N CPRBs may be defined within one CP zone.

Referring to FIG. 19, a UE may attempt to occupy a CPRB at a specific point of time. In this case, a region in which a specific UE can attempt to occupy a CPRB at a specific point of time is called an UL contention group. The UL contention group may include M CP zones. One CP zone may include N CPRBs that may be occupied by a UE. In this case, N×M means the number of CPRBs (hereinafter referred to as a "candidate CPRB") which may be selected by a specific one UE in a corresponding contention group at a specific point of time.

If a contention group is configured in 2 subframes and one CP zone is defined in a subframe unit, (2×N) candidate CPRBs that may be occupied by a UE may be included in the corresponding contention group. That is, the UE has the 2N candidate CPRBs and the UE can transmit data through at least one of the 2N candidate CPRBs without receiving an UL grant. For example, if 2 zones having 4 CPRBs correspond to one contention group, a UE has candidate CPRBs corresponding to (N×M=8). Meanwhile, the UE can transmit data through one of the 2N candidate CPRBs without receiving an UL grant, and thus needs to separately obtain information necessary for data transmitted through an UL grant in a conventional technology.

Hereinafter, an SR procedure is assumed and a scheme for configuring a CP zone for a BSR is described.

Method of Transmitting Information about CP Zone

In the present invention, a specific cell transmits information about a CP zone to a UE. The specific cell needs to notify the UE that the corresponding cell is a cell having the CP zone. Furthermore, in order for the UE to transmit data without receiving an existing UL grant, an eNB need to notify the UE of information necessary to transmit the data using another scheme. The information about the CP zone may include information providing notification that the specific cell is a cell having the CP zone or information necessary for transmission using the CP zone. Four schemes for transmitting information about a CP zone are hereinafter proposed. The information is one of pieces of cell-common information and may be transmitted as one of pieces of system information. Specifically, the information about a CP zone may be transmitted by an eNB as a broadcasting message (e.g., system information or a master information block (MIB)). In some cases, the information about a CP zone may be defined as a unicast message for a specific UE and transmitted. In this case, the specific cell may be preferably a small cell.

The first scheme: CP zone information may be transmitted through a master information block (MIB) in which essential physical layer information is transmitted. In this case, the CP zone information may be transmitted through a field added to the master information block.

The second scheme: Information about a CP zone may be transmitted through a conventional system information block (SIB). In this case, the conventional system information block is called an SIB-x. The information about a CP zone may be transmitted through SIB-x (e.g., an SIB-1 or SIB-2) according to circumstances. Preferably, if a CP zone is configured for random access, information about a CP zone may be transmitted through the SIB-2 because it is information necessary for initial network access. That is, in the present invention, if a CP zone is configured for a random access procedure, information about a CP zone may be included in a conventional SIB2 and may be transmitted from an eNB to a UE. Accordingly, the UE that has received a message may recognize in advance that the UE can access a cell by transmitting an RRC connection request message through the CP zone.

The third scheme: Information about a CP zone may be transmitted through a new SIB. In this case, the new SIB is called an SIB-y. For example, if a CP zone is configured for a procedure after network connection, information about a CP zone may be transmitted through a newly defined SIB. In this case, an eNB may instruct a UE that a specific cell connected by the UE is a cell from which a new SIB has to be received in advance. The instruction may be transmitted through an MIB or SIB. The SIB may be preferably the SIB1 or SIB2.

The fourth scheme: Information about a CP zone may be transmitted through a new control message according to a unicast scheme. If a UE is connected to a corresponding cell, only a UE that wants to use a CP zone may receive information about the corresponding zone.

Information about a CP zone is not limitedly transmitted in the above proposed schemes and may be transmitted according to a scheme in which the proposed schemes have been combined.

Detailed information included in information about a CP zone is described below.

Information (Parameter) Transmitted for CP Zone Configuration

A CP zone proposed by the present invention may be defined as at least one CP zone depending on its object (e.g., a CP zone for a random access procedure or a CP zone for a BSR). That is, at least one of several CP zones may be configured for the same procedure. If the at least one CP zone is configured for the same procedure, information about the at least one CP zone may be defined as information about one CP zone. Meanwhile, the CP zone information may include the following information 1) and 2).

1) UL Resource Information in which CP Zone has been Configured

Information about a CP zone included in an SIB, an MIB, etc. may include UL resource information in which a CP zone has been configured. For example, the UL resource information may include information about the number N of CPRBs which may be occupied by a plurality of UEs in one CP zone as described above. Furthermore, the UL resource information may include information about the number M of CP zones that a specific UE may attempt to occupy at a specific point of time. As described above, N×M indicates the number of candidate CPRBs, that is, CPRBs which may be selected by a specific UE at a specific point of time. That is, the UE has N×M candidate CPRBs. Meanwhile, an eNB may not configure a corresponding zone in all of UL subframes by taking into consideration resource usage.

2) Information Necessary for Transmission of Data that may be Transmitted as Configured CPRB Information about a CP zone included in an SIB, an MIB, etc. may include information necessary for the transmission of data that may be transmitted as a configured CPRB. The information necessary for data transmission may include information transmitted through an existing UL grant.

At least one of a maximum resource block size for each user equipment (UE), a modulation and coding scheme (MCS) level and initial transmission power reference may be defined as the information necessary for the transmission of data that may be transmitted as the configured CPRB. Meanwhile, the information necessary for data transmission may be set for all of UEs that access a cell.

Method of Configuring CP Zone

A method of configuring a CP zone is described below assuming that a CP zone is configured for a BSR. In an SR procedure if a CP zone is not configured, a BSR may be performed only when an UL grant is received after a scheduling request. In contrast, if a scheduling request is performed, a UE may transmit a BSR message using the same time resource or consecutive resources as that of a scheduling request message. That is, if a CP zone has been configured for a BSR, a scheduling request message and the BSR may be transmitted using the same transmit time interval (TTI), an adjacent TTI or another TTI. A relation between a scheduling request and a CP zone is described.

A detailed method of configuring a CP zone for a BSR according to an embodiment of the present invention is described below with reference to FIG. 21. FIG. 21(a) shows an intra-subframe configuration scheme, FIG. 21(b) shows an inter-subframe configuration scheme, and FIG. 21(c) shows a mixed scheme.

An SR and a CP zone may be configured using the intra-subframe configuration scheme or the inter-subframe configuration scheme. Alternatively, the two schemes may be set as a mixed scheme.

Referring to FIG. 21(a), an SR and a CP zone may be configured according to the intra-subframe configuration scheme. In accordance with the intra-subframe configuration scheme, an SR and a CP zone for a BSR may be transmitted together within the same subframe. That is, the SR and the BSR may be transmitted in one subframe. This may be said that the SR and the BSR are transmitted in one TTI. In this case, a time division multiplexing scheme or a frequency division multiplexing scheme may be used.

Referring to FIG. 21(b), a PRACH and a CP zone may be configured according to the inter-subframe configuration scheme. In accordance with the inter-subframe configuration scheme, an SR and a CP zone for a BSR are transmitted in different neighbor subframes. After an SR is transmitted in one subframe, a CP zone for a BSR (or BSR) may be transmitted in a subsequent subframe. That is, the SR and the CP zone for a BSR are transmitted in 2 TTIs.

Furthermore, an SR and a CP zone for a BSR may be configured according to a mixture of the two schemes as shown in FIG. 21(c). For example, an SR may be configured every subframe, but a CP zone may be configured at intervals of two subframes.

An SR and a CP zone for a BSR may be configured according to various schemes depending on a cell operation scheme. Meanwhile, in order to maximize resource utilization within a cell, an SR and a CP zone for a BSR may not be configured in a specific subframe. The latency of a system can be minimized using the aforementioned definition of a CP zone and a method of configuring a CP zone in a cell.

An SR procedure is described in detail assuming that a CP zone is configured for a BSR.

FIG. 22 is a diagram for illustrating a comparison between SR procedures depending on whether a CP zone has been configured.

In this case, the SR procedure shown in FIG. 22(a) if a CP zone has not been configured is assumed to be performed according to the 5-step.

Referring to FIG. 22(a), an UL data transmission procedure if a CP zone has not been configured may be performed in five steps. However, if a CP zone has been configured for a buffer status report (BSR), the UL data transmission procedure may be reduced to three steps as in FIG. 22(b). That is, after receiving system information including information about a CP zone for a BSR from an eNB, a UE may directly perform a BSR without receiving an UL grant for a BSR. Accordingly, if a CP zone is configured, there is an advantage in that the time taken to wait for the reception of an UL grant for a BSR can be reduced.

In this case, it is assumed that an SR is transmitted through a PUCCH in the same manner as the on-off keying scheme as in a conventional technology and a PUCCH resource for each UE has been previously allocated.

Meanwhile, in order to support both the 5-step SR transmission scheme shown in FIG. 22(a) and the 3-step SR transmission scheme shown in FIG. 22(b), an SR may include a specific indicator indicative of an SR transmission scheme. For example, if the specific indicator is 0, the specific indicator indicates the non-contention-based transmission scheme (FIG. 22(a)). If the specific indicator is 1, the specific indicator indicates the contention-based SR transmission scheme (FIG. 22(b)).

An effect if a CP zone is configured for a BSR is described below with reference to FIG. 23.

Referring to FIG. 23(a), if a CP zone has not been configured, a UE that performs the contention-based SR procedure transmits an SR. A network that has received the SR transmits an UL grant to the UE through a PDCCH in order to allocate radio resources. That is, a transport block is allocated to the UE as radio resources for BSR transmission. In a component 6, the UE transmits a BSR to the eNB using the allocated radio resource. In a component 8, the eNB that has received the BSR allocates radio resources to the UE again based on the BSR and transmits an UL grant for actual data transmission to the UE through a PDCCH. In this case, total latency until a component 10 is 17.5 [ms] or 19.5 [ms] as shown in Table 4 below.

TABLE 4

| Component | Description | Time [ms] |
|---|---|---|
| 1 | Average delay to next SR opportunity (1 ms/5 ms PUCCH cycle) | 0.5/2.5 |
| 2 | UE sends Scheduling Request | 1 |
| 3 | eNB decodes Scheduling Request and generates the Scheduling Grant | 3 |
| 4 | Transmission of Scheduling Grant | 1 |
| 5 | UE Processing Delay (decoding of scheduling grant + L1 encoding of UL data) | 3 |
| 6 | Transmission of BSR | 1 |
| 7 | UE Processing Delay (decoding of scheduling grant + L1 encoding of UL data) | 3 |
| 8 | Transmission of Scheduling Grant | 1 |
| 9 | UE Processing Delay (decoding of scheduling grant + L1 encoding of UL data) | 3 |
| 10 | Transmission of actual data | 1 |
| | Total delay | 17.5/19.5 |

Referring to FIG. 23(b), if a CP zone has been configured, a UE that performs the contention-based SR procedure transmits an SR. In this case, a BSR is also transmitted in a subframe neighboring the SR or in the same subframe (component 3). A network that has received the SR and BSR transmits an UL grant to the UE through a PDCCH in order to allocate radio resources (component 5). That is, a transport block is allocated to the UE as radio resources for actual data transmission. In a component 6, the UE transmits actual data to the eNB using the allocated radio resources (component 7). In this case, total latency until the component 7 is 9.5 [ms] or 11.5 [ms] as shown in Table 5 below.

TABLE 5

| Component | Description | Time [ms] |
|---|---|---|
| 1 | Average delay to next SR opportunity (5 ms PUCCH cycle) | 0.5/2.5 |
| 2 | UE sends Scheduling Request | 1 |
| 3 | Transmission of BSR | 0 |
| 4 | UE Processing Delay (decoding of scheduling grant + L1 encoding of UL data) | 3 |
| 5 | Transmission of Scheduling Grant | 1 |
| 6 | UE Processing Delay (decoding of scheduling grant + L1 encoding of UL data) | 3 |

TABLE 5-continued

| Component | Description | Time [ms] |
|---|---|---|
| 7 | Transmission of actual data | 1 |
| | Total delay | 9.5/11.5 |

That is, as a result of the configuration of a CP zone, latency of 8 [ms] can be reduced compared to latency before a CP zone is configured.

In accordance with the present invention, however, a collision may be generated in a process of occupying corresponding resources because a plurality of UEs performing SR procedures occupies the resources through a contention. Accordingly, a method of occupying contention-based uplink resources in order to prevent such a collision is described below.

FIG. 24 shows a method of occupying a contention-based resource block based on UL physical resources according to an embodiment of the present invention.

The number of CPRBs may be configured to be the same as the number of SRs so that the CPRB is mapped to the SR in a one-to-one manner in the relation with the SR and may be configured to be smaller than that of SRs.

In this case, it is assumed that a CP zone having N CPRBs or more is configured if N SRs are allocated to one subframe. That is, the SR and the CPRB may be mapped in a one-to-one relation.

FIG. 24(a) is a diagram for illustrating a resource block occupation method according to a physical index if the number of contention-based resource blocks (CPRBs) is greater than or equal to the number of SRs. In this case, FIG. 24(a) shows that SRs and CPRBs have been configured according to the intra-subframe configuration scheme, but the following contents may also be applied the inter-subframe configuration scheme or a mixed scheme.

If CPRBs are defined in accordance with the number of SR resources allocated within one subframe or a plurality of subframes, the CPRBs and the SRs are mapped in a 1:1 manner. Accordingly, the SRs and the CPRBs can be mapped without a collision between them. In this case, the CPRB may be configured as a CPRB having the same index as a PUCCH physical index for the SR. If an SR is allocated to a resource corresponding to an index 3, a corresponding UE may also transmit a message (e.g., a BSR) to be transmitted using a CPRB corresponding to the CPRB #3. In this case, the physical index may mean a value that belongs to SR configuration information and that corresponds to a PUCCH resource index.

However, a CPRB may be allocated using the logical index of an SR instead of a physical index according to circumstances.

FIG. 24(b) is a diagram for illustrating a resource block occupation method according to a logical index if the number of contention-based resource blocks (CPRBs) is greater than or equal to the number of SRs.

Meanwhile, in this case, FIG. 24(a) shows that SRs and CPRBs have been configured according to the inter-subframe configuration scheme, but the following contents may also be applied to the intra-subframe configuration scheme or the mixed scheme.

If CPRBs corresponding to the number of SR resources allocated within one subframe or a plurality of subframes are defined, the SRs and the CPRBs can be mapped without a collision between them because they are mapped in a 1:1 manner. In this case, the CPRB may be configured as a CPRB having the same index as a PUCCH logical index for the SR. If the logical index of a resource to which an SR has been allocated corresponds to 0, a corresponding UE (UE1 of FIG. 24(b)) may transmit a message (e.g., a BSR) to be transmitted through a CPRB corresponding to a CPRB #0 having the same index as a logical index.

In this case, the PUCCH logical index means an index obtained by logically newly mapping a PUCCH resource index from 0 for the SR of UEs in a corresponding subframe. This means that the PUCCH logical index needs to be newly defined in an SR configuration information element and transmitted. Accordingly, an eNB may notify the UE of the logical index of an SR when transmitting the SR. The logical index may be indicated by an implicit or explicit scheme.

Meanwhile, it is assumed that a CP zone having CPRBs smaller than a total N is configured if N SRs are allocated to one subframe. That is, this corresponds to a case where SRs and CPRBs cannot be mapped in a one-to-one relation.

If the number of CPRBs is set smaller than the number N of SRs, a collision may be generated when a BSR is transmitted. Furthermore, a CP zone has a better possibility that a contention-based uplink resource collision may be generated between UEs in the process of transmitting data at the same time or as the number of UEs performing BSRs is increased.

There is hereunder proposed a method for minimizing a collision which may occur in the process of occupying resources if a CP zone is configured.

(1) A random selection method: a UE may randomly select a CPRB for a BSR.

(2) A selection method based on the ID of a UE: each UE may select a CPRB based on the ID of the UE. In this case, the CPRB selected by the UE and the ID of the UE may have a relation, such as Equation 1 below.

$$\text{(Index of CPRB block selected by UE)} = \text{(ID of UE)} \bmod X \quad \text{[Equation 1]}$$

The index of a CPRB block (or the index of a contention-based resource) selected by a UE is a value obtained by performing modulo operation using the ID of the UE as X. That is, the CPRB block selected by the UE corresponds to the remaining value obtained by dividing the ID of the UE by X. In this case, X means the number of CPRBs which may be occupied by the UE that performs an SR procedure. The value X may be obtained by the UE through system information. In this case, the ID of the UE is a parameter by which a subscriber can be identified, and may be a single UE ID, for example, an international mobile subscriber identity (IMSI), a globally unique temporary identifier (GUTI), a SAE temporary mobile subscriber identity (S-TMSI) or an IP address (packet data network (PDN) address). Alternatively, the ID of the UE may be a parameter used to identify a UE within a cell, for example, a C-RNTI. That is, this means that the ID of the UE may be applied to the ID of a UE which is variously used in a cellular network.

The method of selecting a CPRB based on the ID of a UE may also be applied to another procedure other than an SR procedure.

(3) A selection method based on an UL physical resource index for an SR: each UE may select a CPRB based on an UL physical resource index for an SR. In this case, an UL physical resource index for the CPRB selected by the UE and the SR may have a relation, such as Equation 2 below.

$$\text{CPRB block index selected by UE} = \text{SR UL physical resource index} \bmod X \quad \text{[Equation 2]}$$

The index of a CPRB block (or the index of a contention-based resource) selected by a UE is a value obtained by performing modulo operation using an UL physical resource index for a selected SR as X. That is, the index of a CPRB block corresponds to the remaining value obtained by dividing an UL physical resource index for the SR selected by the UE by X. In this case, X means the number of CPRBs which may be occupied by the UE that performs an SR procedure. The value X may be obtained by the UE through system information. In this case, the UL physical resource index for the SR may mean a value that belongs to SR configuration information elements and that corresponds to a PUCCH resource index.

That is, the index of the CPRB block may mean the remaining value obtained by dividing the UL physical resource index for the SR selected by X. In this case, X means the number of CPRB blocks which may be occupied by the UE that performs an SR procedure. The value X may be obtained through system information. In this case, the UL physical resource index for the SR may mean a value that belongs to SR configuration information elements and that corresponds to a PUCCH resource index.

(4) A selection method based on an uplink logical resource index for an SR: each UE may select a CPRB based on an uplink logical resource index for an SR. In this case, the CPRB selected by the UE and the uplink logical resource index for the SR may have a relation, such as Equation 3 below.

$$\text{CPRB block index selected by UE} = \text{SR UL logical resource index} \bmod X \quad \text{[Equation 3]}$$

The index of a CPRB block (or the index of a contention-based resource) selected by a UE is a value obtained by performing modulo operation using an uplink logical resource index for the selected SR as X.

That is, the index of the CPRB block corresponds to the remaining value obtained by dividing the UL physical resource index for the SR selected by the UE by X. In this case, X means the number of CPRBs which may be occupied by the UE that performs an SR procedure. The value X value may be obtained by the UE through system information. In this case, a PUCCH logical index means an index obtained by newly logically mapping a PUCCH resource index allocated for the SR of UEs from 0 in a corresponding subframe. This means that the PUCCH logical index needs to be newly defined in an SR configuration information element and transmitted.

In the case where the number of CPRBs is set smaller than the number of SRs as described above, if a value other than an aliquot of N corresponding to the number of SRs is set as X, a specific CPRB may be much selected by a plurality of UEs. As a result, there may be a better possibility that a collision may occur. Accordingly, it is preferred that X is defined as an aliquot of the number of SRs N, but this is not a limit to the present invention. For example, if N is 6, X may be preferably defined as one of 1, 2, 3 and 6.

If the number of SRs allocated to the PUCCH of a specific subframe is N and the number of CPRBs for the transmission of a BSR corresponding to the number of allocated SRs is N as described above, a probability that a collision may occur between a UE and another UE when the UE transmits a BSR through a CPRB is low.

Figure 25:
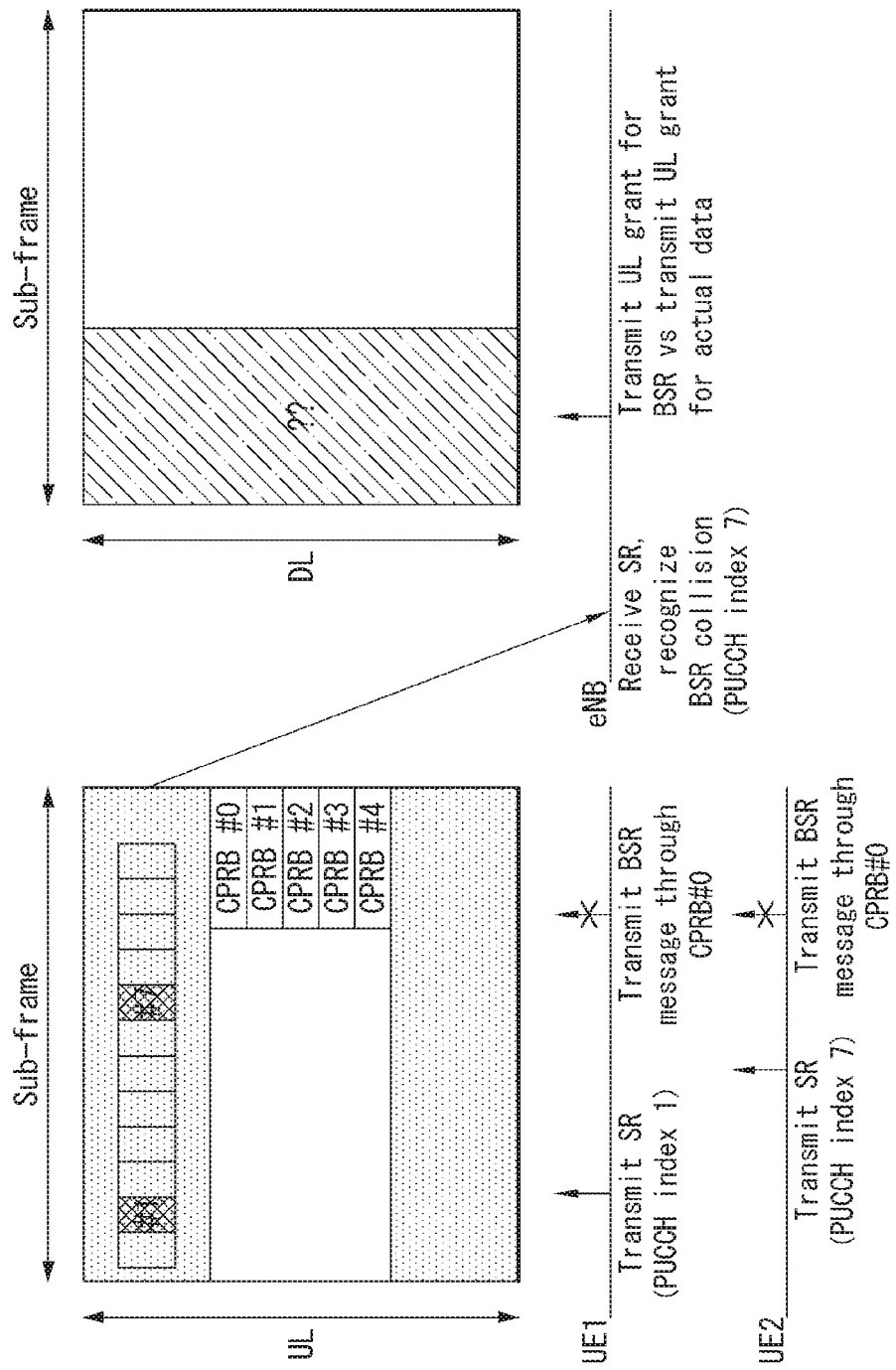
FIG. 25 is a diagram for illustrating a problem according to the method of occupying a contention-based resource block based on UL physical resources of the present invention.

In contrast, if the number of CPRBs for the transmission of a BSR corresponding to N SRs allocated to a PUCCH is set to (N−1) or less, there may occur a problem in that one or more UEs may transmit BSRs at the same time through a CPRB occupied by a specific UE. For example, in FIG. 25, it may be assumed that if a UE 1 and a UE 2 transmit SRs at the same time, the PUCCH index of an SR allocated to the UE 1 is 1 and a PUCCH index allocated to the UE 2 is 7. As described above, if each UE randomly selects a CPRB, both the UE 1 and the UE 2 may select a CPRB corresponding to a CPRB index 1 for the transmission of a BSR.

In this case, a network receives an SR for the UE 1 through a PUCCH resource, that is, a PUCCH index 1, and receives an SR for the UE 2 through a PUCCH resource, that is, a PUCCH index 7. However, a BSR for each UE is transmitted through the same CPRB resource CPRB #1, and thus the network can recognize that a collision is generated with respect to the BSR.

In this case, from a viewpoint of the network, whether an UL grant for a BSR will be transmitted or an UL grant for actual data will be transmitted may be problematic when an UL grant is transmitted to the UE.

From a viewpoint of the eNB, it may be preferred that a BSR grant is transmitted to each UE because a collision has been recognized. However, from a viewpoint of the UE, there may be a problem in that whether the eNB has transmitted a grant for a BSR or a grant for the transmission of actual data because a collision was not generated is not recognized is not recognized because resources have been transmitted through the same CPRB. Accordingly, from a viewpoint of the UE, whether a BSR will be transmitted or actual data will be transmitted with respect to the uplink grant may be problematic because the UE has already transmitted a BSR. Furthermore, from a viewpoint of the eNB, there may be a problem in that a resource allocation amount for each UE is determined if an uplink grant for actual data is transmitted.

A method of recognizing a collision when one or more UEs transmit BSRs at the same time using the same resource and a method for solving the collision are proposed herein.

Figure 26:
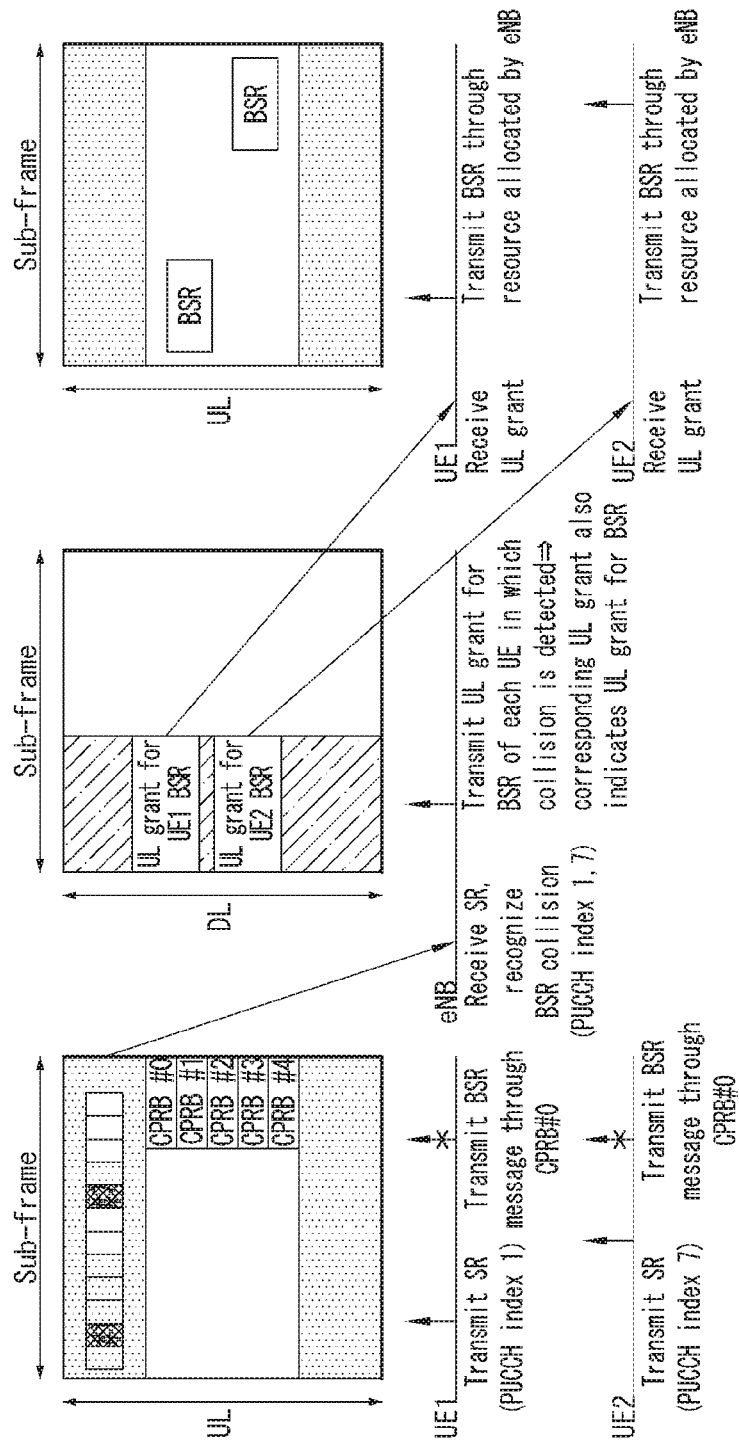
FIG. 26 is a diagram for illustrating a method of transmitting/receiving an UL grant when a collision occurs due to the occupation of contention-based resources according to another embodiment of the present invention.

FIG. 26 is a diagram for illustrating a method of transmitting/receiving an UL grant when a collision occurs due to the occupation of contention-based resources according to another embodiment of the present invention.

Referring to FIG. 26, an eNB that has recognized a collision of a BSR transmits an UL grant according to a conventional SR procedure so that a corresponding UE transmits a BSR again. That is, the eNB transmits an UL grant for the BSR transmission. In this case, the eNB also transmits an indication providing notification that the corresponding UL grant is resource allocation for requesting the BSR.

Specifically, as in the description of FIG. 26, when a UE 1 and a UE 2 transmit SRs at the same time, if each of the UEs randomly selects a CPRB, both the UE 1 and the UE 2 may select CPRBs corresponding to a CPRB index 1 for the transmission of the BSRs. In this case, the eNB receives the SR of the UE 1 through a PUCCH resource, that is, a PUCCH index 1, and receives the SR of the UE 2 through a PUCCH resource, that is, a PUCCH index 7. However, a collision may be generated between the BSRs of the respective UEs because the BSRs are transmitted through the same CPRB resource.

Accordingly, as in the description of FIG. 26, in order to overcome a problem which may occur due to a collision, the eNB indicates that the UL grant is for the BSR while transmitting the corresponding UL grant for the BSR transmission to each UE because the eNB has recognized a collision.

That is, if the BSR of the UE is successfully through the CPRB, the eNB transmits an UL grant for actual data without a special indication. In contrast, if SRs have been received from two or more UEs through PUCCH resources, but the reception of a BSR has failed, an eNB also transmits an indication providing notification that a corresponding UL grant is for BSR transmission while transmitting the UL grant for the BSR.

When the indication providing notification that corresponding uplink is for the BSR transmission is received from the eNB along with the UL grant, the UE transmits the BSR through resources allocated by the eNB.

Accordingly, if a collision is generated in BSR according to the proposed selection method of CPRB, an error attributable to a resource collision can be prevented from occurring because an UL grant for a BSR is transmitted.

Furthermore, if such a procedure is used, latency can be reduced when a BSR is successfully transmitted. Furthermore, although the transmission of a BSR fails and thus a grant for the BSR is received, latency is not increased compared to a conventional technology. Accordingly, in accordance with the present invention, an effect in that latency can be reduced using a contention-based uplink resource will be obtained.

A method of transmitting UE recognizer information and data at the same time using the aforementioned a contention resource (a CP zone, a CPRB, etc.) is described below.

The method of transmitting UE recognizer information and data at the same time using the contention resource may be performed through the following three procedures.

Figure 27:
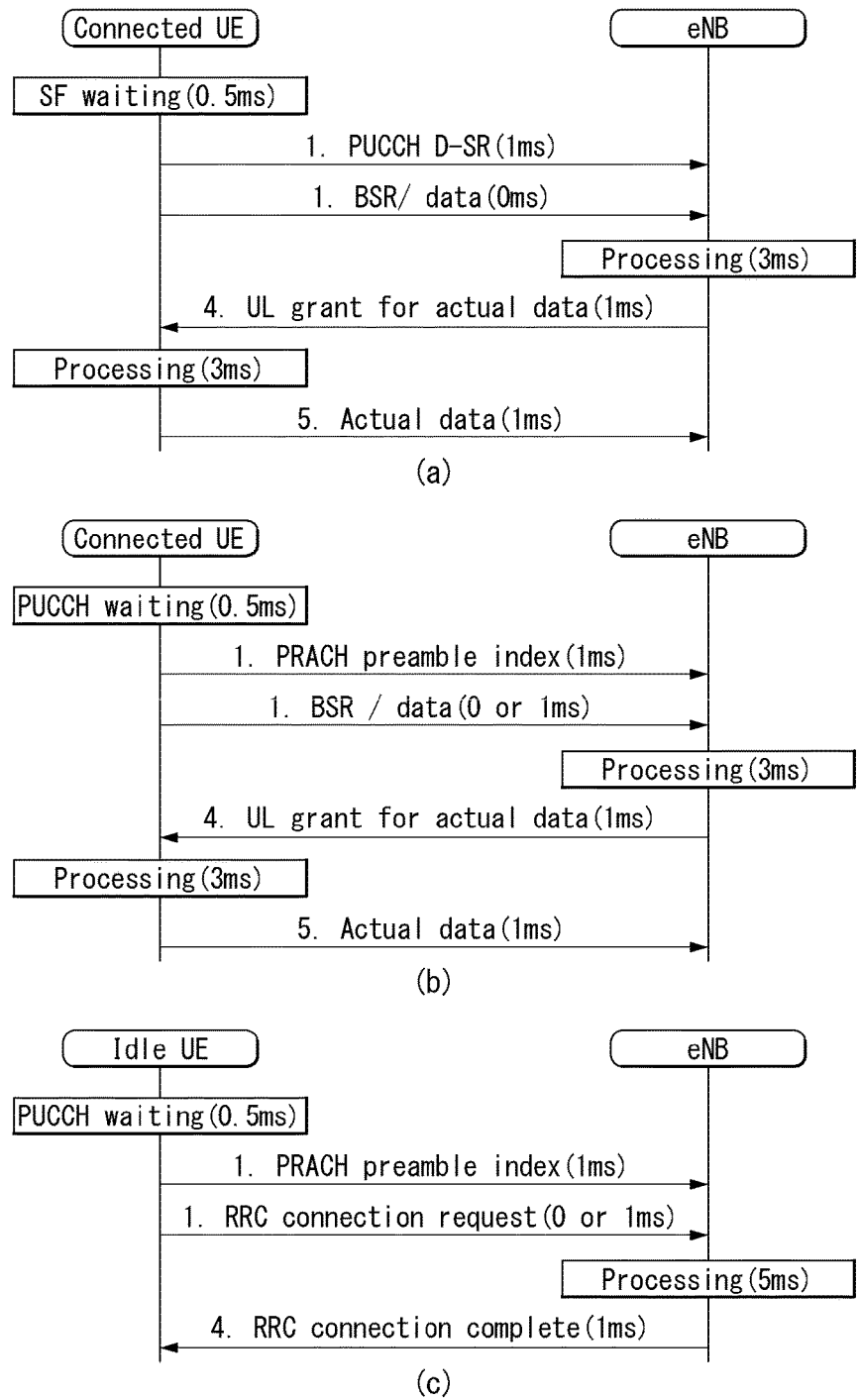
FIG. 27 is a diagram illustrating procedures of transmitting data using a contention resource.

FIG. 27 is a diagram sequentially illustrating the following three procedures (procedures for transmitting data using a contention resource).

A UE in the connected state to which a scheduling request (SR) has been allocated may transmit UE recognizer information and data at the same time through a PUCCH SR+contention based (CB) PUSCH transmission method (BSR, actual data (DRB or SRB)). This corresponds to FIG. 27a.

A UE in the connected state to which an SR has not been allocated may transmit UE recognizer information and data at the same time through a PRACH preamble+CB PUSCH transmission method (BSR, actual data (DRB or SRB)). This corresponds to FIG. 27b.

A UE in the idle mode or an idle state may transmit UE recognizer information and data at the same time through a PRACH preamble+CB PUSCH transmission method (RRC connection request, BSR, actual data). This corresponds to FIG. 27c.

In this case, the DRB indicates a data radio bearer and the SRB indicates a signaling radio bearer.

The three procedures are described in more detail with reference to FIGS. 27a to 27c.

First, FIG. 27a is described.

FIG. 27a shows the first procedure of the aforementioned three procedures, that is, a method of performing an SR procedure using a contention resource.

That is, FIG. 27a shows a method of transmitting, by a UE in the connected state to which an SR has been allocated, a PUSCH using a PUCCH SR and a contention resource.

In this case, the PUSCH transmission may mean the transmission of a buffer status report (BSR) or actual data (DRB, SRB).

Referring to FIG. 27a, the UE in the connected state transmits both a PUCCH D-dedicated-SR (D-SR) and a PUSCH to an eNB.

The PUSCH is transmitted to the eNB based on a contention, that is, through a contention resource (CPRB), and may be a BSR or actual data.

If the PUSCH is a BSR, the eNB transmits an UL grant for actual data transmission to the UE in the connected state.

The UL grant is transmitted through a PDCCH.

Thereafter, the UE in the connected state transmits actual data to the eNB based on the received UL grant.

FIG. 27b is described below.

FIG. 27b shows the second procedure of the aforementioned three procedures, that is, a method of performing a random access channel (RACH) SR procedure using a contention resource.

That is, FIG. 27b shows a method of transmitting, by a UE in the connected state to which an SR has not been allocated, (or a contention-based) PUSCH using a PRACH preamble and a contention resource.

That is, FIG. 27b shows a procedure of transmitting, by the UE in the connected state to which an SR has not been allocated, BSR or actual data to an eNB by receiving an UL grant from the eNB through an RACH procedure.

Furthermore, FIG. 27b is a method for transmitting a BSR or actual data at once or together through a contention resource (CPRB) while transmitting an RACH preamble index at the same time in order to rapidly perform an RACH SR.

In this case, the RACH preamble index may be a dedicated preamble index previously allocated by an eNB or may be a randomly selected random preamble index.

In this case, the PUSCH transmission may mean the transmission of a buffer status report (BSR) or actual data (DRB, SRB).

Referring to FIG. 27b, a UE in the connected state transmits both a PRACH preamble index and a PUSCH to an eNB.

The PUSCH is transmitted to the eNB based on a contention, that is, through a contention resource, and may be a BSR or actual data.

If the PUSCH is a BSR, the eNB transmits an UL grant for actual data transmission to the UE in the connected state.

The UL grant is transmitted through a PDCCH.

Thereafter, the UE in the connected state transmits actual data to the eNB based on the received UL grant.

FIG. 27c is described below.

FIG. 27c shows a method of performing the third procedure of the aforementioned three procedures, that is, an initial RACH procedure using a contention resource.

That is, FIG. 27c shows a method of transmitting, by a UE in the idle state or idle mode, a (or contention-based) PUSCH using a PRACH preamble and a contention resource.

In this case, the PUSCH transmission may mean the transmission of an RRC connection request message or a buffer status report (BSR) or actual data (DRB, SRB).

Referring to FIG. 27c, the idle UE transmits a PRACH preamble index and a PUSCH to an eNB.

If the PUSCH is an RRC connection request message, the eNB transmits an RRC connection complete message to the idle UE.

If the PUSCH is a BSR, the eNB transmits an UL grant for actual data transmission to the UE in the non-connected state.

The UL grant is transmitted through a PDCCH.

Thereafter, the UE in the non-connected state transmits actual data to the eNB based on the received UL grant.

In FIGS. 27b and 27c, if the RACH preamble and the PUSCH data cannot be transmitted within one subframe (SF) (e.g., due to a problem of power and a physical structure), the PRACH preamble and the contention resource may be transmitted through contiguous SFs. In this case, a data transmission time through the contention resource may be delayed by 1 SF (1 ms).

A method for solving a problem in that a UE cannot be recognized when a collision is generated in PUSCH transmission, such as a BSR or actual data, through a contention resource (CPRB) (or when a collision is generated in contention resources) is described below.

First, a situation in which a UE cannot be recognized when a collision is generated in a contention resource (CPRB) is described with reference to FIGS. 28 to 31.

Figure 28:
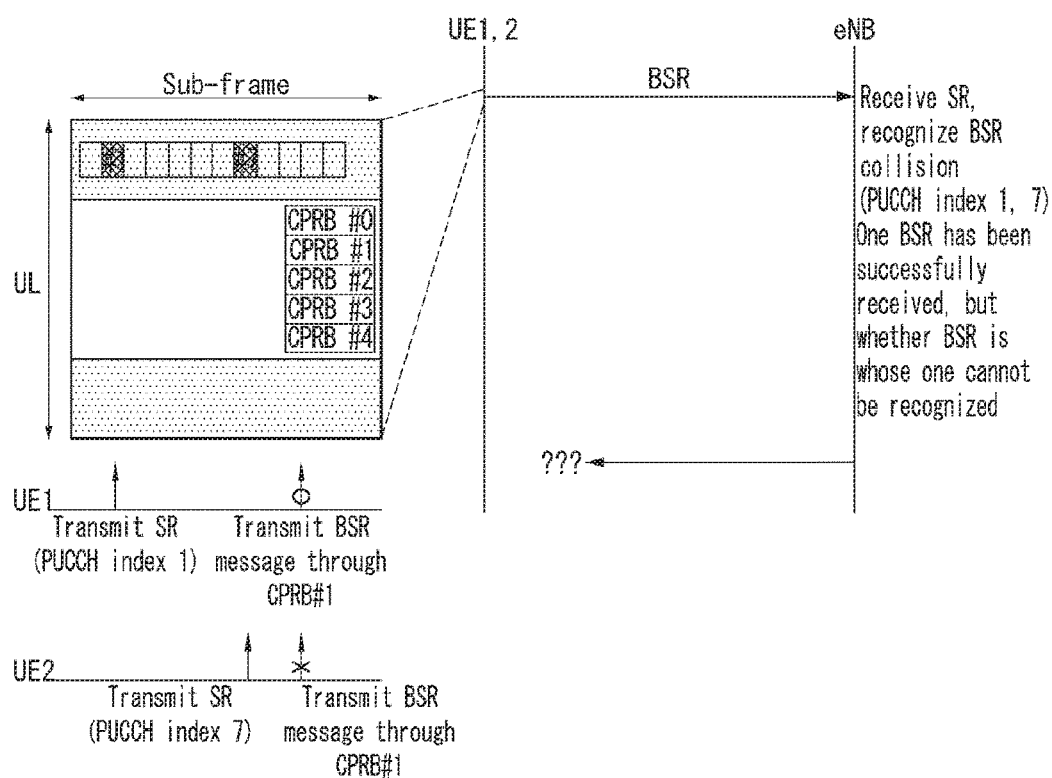
FIG. 28 is a diagram illustrating an example of a situation in which the recognition of a UE is impossible due to a collision in a contention resource when a BSR is transmitted through a contention resource (CPRB).

FIG. 28 is a diagram illustrating an example of a situation in which the recognition of a UE is impossible due to a collision in a contention resource when a BSR is transmitted through a contention resource (CPRB).

Furthermore, FIG. 28 shows a problem in that the recognition of a UE is impossible due to a CPRB collision in the 3-step SR procedure.

Referring to FIG. 28, a UE 1 and a UE 2 may transmit BSRs to an eNB through a contention resource (CPRB) "CPRB #1" at the same time while transmitting respective SRs "PUCCH index 1 and PUCCH index 7" allocated thereto.

In this case, the two UEs UE 1 and UE 2 transmit respective BSR MAC PDU generated by to the eNB using the same CPRB "CPRB #1."

If the UE 1 and the UE 2 are geographically spaced apart from each other, the UE 1 is located in the central part of a cell (i.e., locate close to the eNB) and the UE 2 is located at the boundary of the cell (located far from the eNB), the eNB receives the BSRs from the two UEs, but successfully receives or decodes only the BSR of the UE 1.

However, the eNB cannot recognize that the BSR has been transmitted by which one of the two UEs through only the reception of the BSRs from the two UEs.

That is, there is a problem in that the eNB has to transmit an UL grant for actual data to a UE from which a BSR has been successfully received and to transmit an UL grant for a BSR to a UE from which a BSR has not been successfully received, but the eNB cannot recognize whether the BSR of which one of the UEs from which the SRs have been received has been successfully received.

Figure 29:
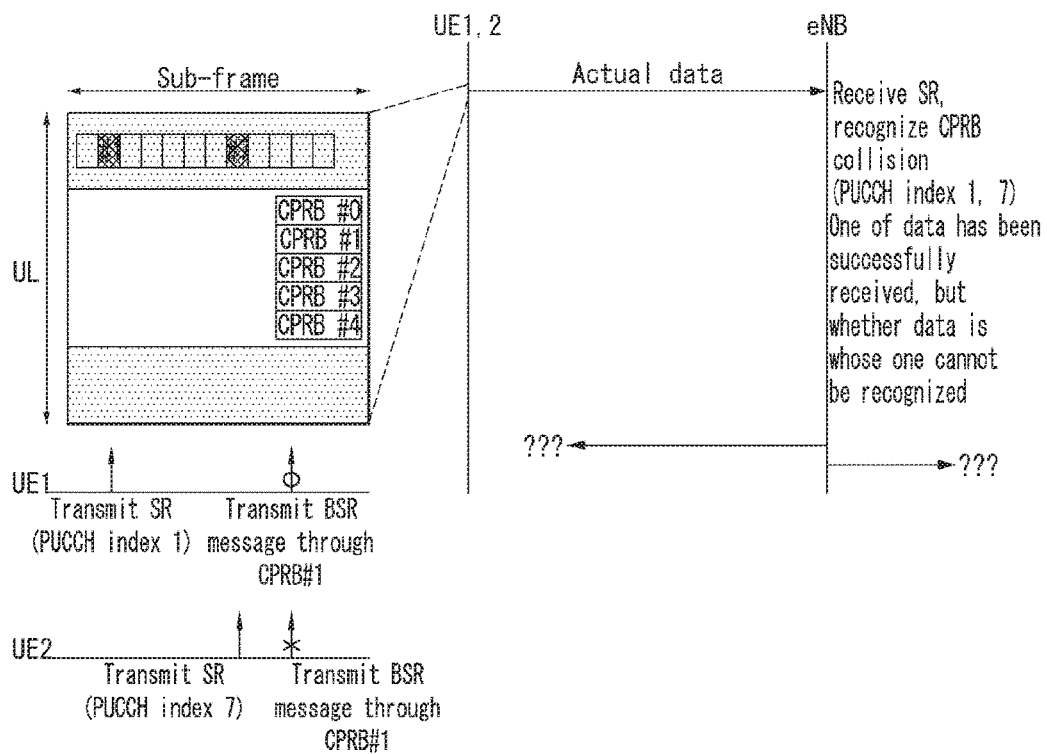
FIG. 29 is a diagram illustrating an example of a situation in which the recognition of a UE is impossible due to a collision in a contention resource when actual data is transmitted through a contention resource (CPRB).

FIG. 29 is a diagram illustrating an example of a situation in which the recognition of a UE is impossible due to a collision in a contention resource when actual data is transmitted through a contention resource (CPRB).

Furthermore, FIG. 29 shows a problem in that the recognition of a UE is impossible due to a CPRB collision in the 1-step SR procedure.

Referring to FIG. 29, a UE 1 and a UE 2 may transmit actual data to an eNB through a contention resource (CPRB) "CPRB #1" while transmitting respective SRs "PUCCH index 1 and PUCCH index 7" allocated thereto at the same time.

In this case, the two UEs UE 1 and UE 2 transmit respective MAC PDUs, including actual data generated by them, to the eNB using the same CPRB "CPRB #1."

If the UE 1 and the UE 2 are geographically spaced apart from each other, the UE 1 is located in the central part of a cell (i.e., locate close to the eNB) and the UE 2 is located at the boundary of the cell (located far from the eNB), the eNB receives the actual data from the two UEs, but successfully receives or decodes only the actual data of the UE 1.

However, the eNB cannot recognize that the actual data has been transmitted by which one of the two UEs through only the reception of the actual data from the two UEs.

That is, if actual data has been successfully received, the eNB has to transmit the corresponding actual data to a high layer through a radio bearer (RB) of a corresponding UE, but the eNB does not recognize that the corresponding actual data is the actual data of which UE.

Furthermore, there is a problem in that the eNB has to transmit an UL grant for actual data transmission to a UE from which the reception of actual data has failed, but the eNB does not recognize that it has to transmit an UL grant for actual data transmission to which one of the UEs that have transmitted the SRs.

Figure 30:
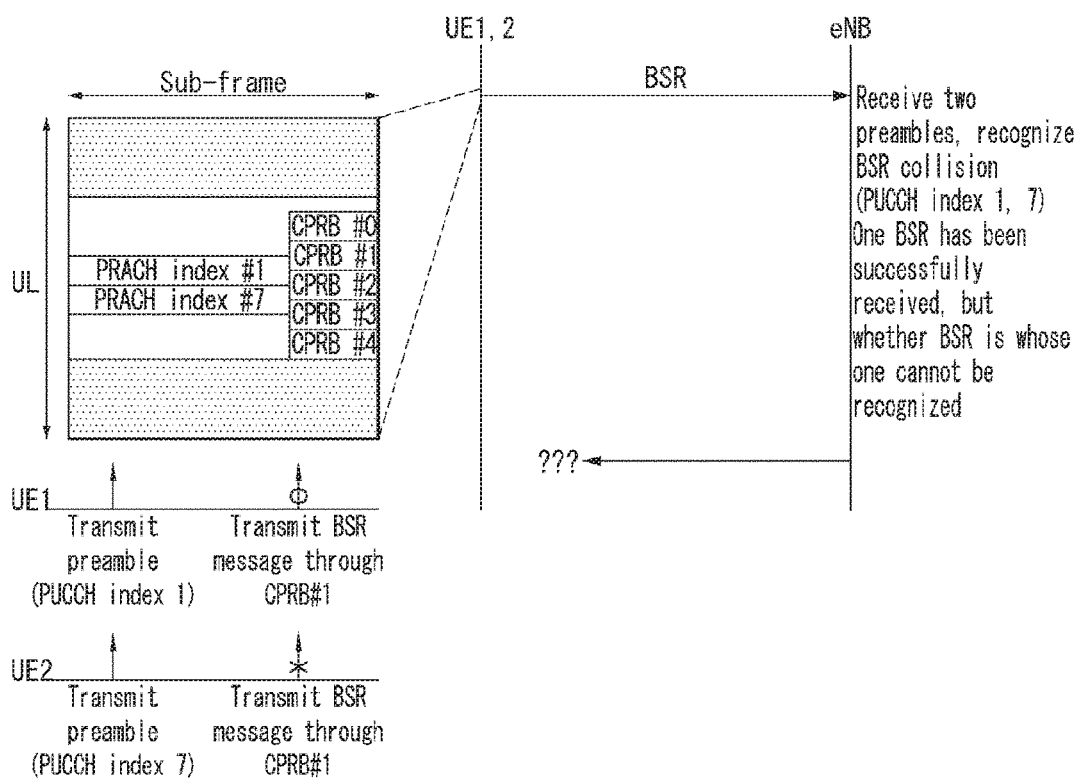
FIG. 30 is a diagram illustrating another example of a situation in which the recognition of a UE is impossible due to a collision in a contention resource when actual data is transmitted through a contention resource (CPRB).

FIG. 30 is a diagram illustrating another example of a situation in which the recognition of a UE is impossible due to a collision in a contention resource when actual data is transmitted through a contention resource (CPRB).

Furthermore, FIG. 30 shows a problem in that the recognition of a UE is impossible due to a CPRB collision in the RACH SR procedure and initial RACH procedure of FIGS. 27*b* and 27*c*.

Referring to FIG. 30, a UE 1 and a UE 2 may transmit BSRs to an eNB through a contention resource (CPRB) "CPRB #1" while transmitting PRACH preamble sequence "index 1 and index 7" to the eNB at the same time.

In this case, the two UEs UE 1 and UE 2 transmit respective BSR MAC PDUs, generated by them, to the eNB using the same CPRB "CPRB #1."

If the UE 1 and the UE 2 are geographically spaced apart from each other, the UE 1 is located in the central part of a cell (i.e., locate close to the eNB) and the UE 2 is located at the boundary of the cell (located far from the eNB), the eNB receives the BSRs from the two UEs, but successfully receives or decodes only the BSR of the UE 1.

However, the eNB cannot recognize that the BSR has been transmitted by which one of the two UEs through only the reception of the BSRs from the two UEs.

That is, there is a problem in that the eNB has to transmit an UL grant for actual data to a UE from which a BSR has been successfully received and to transmit an UL grant for a BSR to a UE from which a BSR has not been successfully received, but the eNB cannot recognize whether the BSR of which one of the UEs from which the PRACH preamble sequences have been received has been successfully received.

Figure 31:
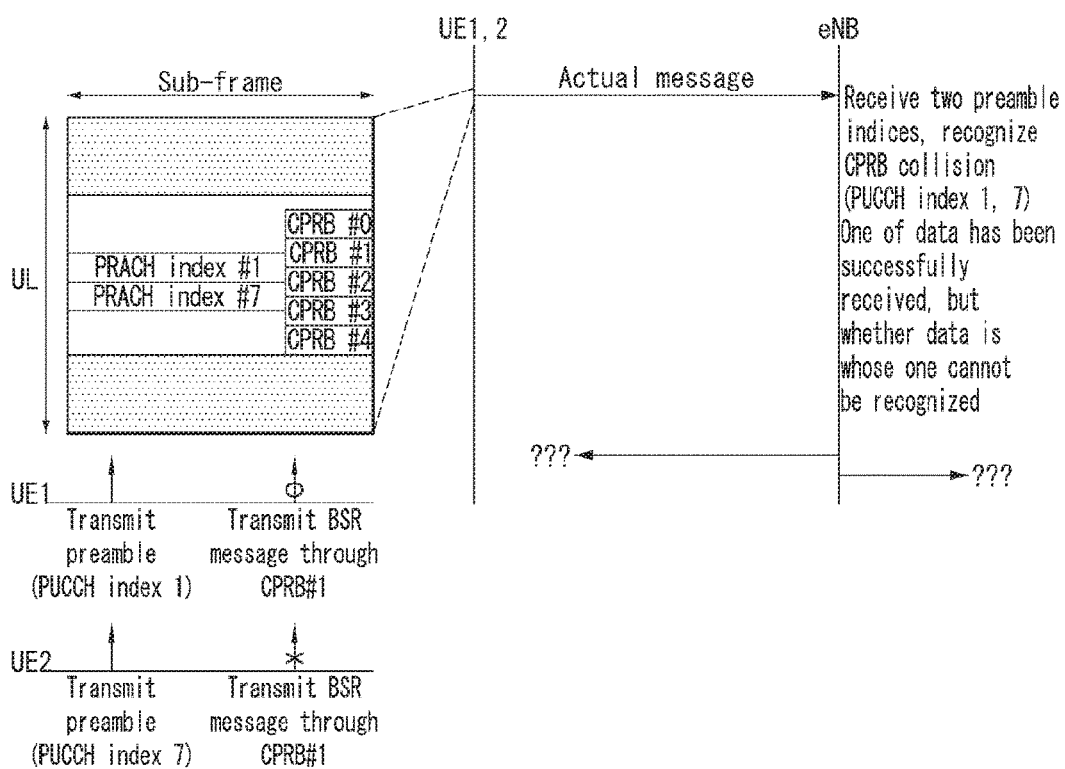
FIG. 31 is a diagram illustrating yet another example of a situation in which the recognition of a UE is impossible due to a collision in a contention resource when actual data is transmitted through a contention resource (CPRB).

FIG. 31 is a diagram illustrating yet another example of a situation in which the recognition of a UE is impossible due to a collision in a contention resource when actual data is transmitted through a contention resource (CPRB).

Furthermore, FIG. 31 shows a problem in that the recognition of a UE is impossible due to a CPRB collision in the RACH SR procedure or initial RACH procedure.

Referring to FIG. 31, a UE 1 and a UE 2 may transmit actual data to an eNB through a contention resource (CPRB) "CPRB #1" while transmitting respective PRACH preamble sequences "index 1 and index 7" at the same time.

In this case, the two UEs UE 1 and UE 2 transmit respective MAC PDUs, including actual data generated by them, to the eNB using the same CPRB "CPRB #1."

In this case, the respectively generated actual data may be DRB data or SRB data or an RRC message, such as an RRC connection request message, in the case of initial network access.

If the UE 1 and the UE 2 are geographically spaced apart from each other, the UE 1 is located in the central part of a cell (i.e., locate close to the eNB) and the UE 2 is located at the boundary of the cell (located far from the eNB), the eNB receives actual data from the two UEs, but successfully receives or decodes only the actual data of the UE 1.

However, the eNB cannot recognize that the actual data has been received from which one of the two UEs through only the reception of the actual data from the two UEs.

That is, if actual data has been successfully received, the eNB has to transmit the corresponding actual data to a high layer through a radio bearer (RB) of a corresponding UE, but the eNB does not recognize that the corresponding actual data is actual data for which UE.

Furthermore, there is a problem in that the eNB has to transmit an UL grant for actual data transmission to a UE from which the reception of actual data has failed, but the eNB does not recognize that it has to transmit an UL grant for actual data transmission to which one of the UEs that have transmitted the PRACH preamble sequences.

Furthermore, the aforementioned situation in which a CPRB collision is generated in the RACH SR procedure is described in more detail.

As described above, if an RACH SR procedure is performed using a contention resource, a PRACH preamble (sequence) index transmitted by a UE may be selected according to the following two methods.

Random Preamble Selection

Previous allocation of a dedicated preamble by an eNB

In this case, if a UE transmits specific data (a BSR, actual data, an RRC connection request, etc.) using a contention resource (CPRB) mapped to a PRACH preamble index while transmitting a PRACH preamble index to the eNB, two or more UEs can occupy the same CPRB. In this case, a CPRB collision may be generated.

The index of the contention resource (CPRB) mapped to the PRACH preamble index, that is, a CPRB index, may be determined to be (PRACH preamble index) % N.

In this case, N indicates a total number of CPRBs (the number of CPRBs)

If the eNB has failed in receiving all of data transmitted by the two or more UEs, the eNB transmits a random access (RA) response (RSP), including the PRACH preamble index, to a UE from which data has not been received so that the corresponding UE performs a conventional RACH SR procedure using the PRACH preamble index.

Furthermore, if the eNB has successfully received data transmitted by some of the two or more UEs, the eNB needs to be capable of determining that the data of which one of the UEs to which a PRACH preamble index has been transmitted has been successfully received or that an UL grant has to be transmitted to which UE through an RA RSP.

Furthermore, the RACH SR procedure may also be used by a UE in the idle state or the idle mode in addition to a UE in the connected state as described above.

For example, in the case of a future 5G technology, in order to realize the fast data transmission of an idle UE, an RACH procedure may be used to transmit UL data without an RRC connection configuration.

In this case, a problem in that the recognition of a UE is impossible in a CPRB collision may also be generated in an idle UE in addition to a connected UE.

That is, as described above (FIGS. 28 to 31), in the SR procedure, RACH SR procedure and initial RACH procedure, if information by which a corresponding UE can be recognized is not included while a PUSCH (a BSR, actual data or RRC connection request) is transmitted through a contention resource, a situation in which an eNB cannot recognize a UE in a CPRB collision is generated.

Accordingly, this specification provides a method of transmitting UE recognizer information for recognizing a UE that transmits specific data when the specific data (a BSR, actual data, an RRC message, etc.) is transmitted using a contention resource in order to solve the problem in that the recognition of a UE is impossible in a CPRB collision (in FIGS. 28 to 31).

The method of transmitting the UE recognizer information of data transmitted through a contention resource (CPRB, etc.), proposed in this specification, is described in more detail below.

The method of transmitting recognizer information, which is proposed in this specification, may be applied to all of procedures of transmitting a BSR or actual data or an RRC message using a contention resource in the SR procedure (3-step, 1-step), RACH SR procedure and initial RACH procedure of FIGS. 27a to 27c.

That is, a major technological characteristic proposed in this specification is to essentially include UE recognizer information, newly defined in this specification, in the step of generating an MAC PDU when a specific UE attempts to rapidly transmit data (or the MAC PDU) to an eNB using a contention resource.

The corresponding major technological characteristic is identically applied to a case where a contention resource is transmitted along with a PRACH preamble in addition to a PUCCH SR.

A method of transmitting an MAC PDU including UE recognizer information through a contention resource is described in more detail below.

First, a UE transmits a PUCCH SR or PRACH preamble index to an eNB and transmits an MAC PDU, including UE recognizer information of the corresponding UE, to the eNB through a contention resource (CPRB) at the same time (or after 1 SF)

The UE recognizer information indicates information for identifying, by an eNB, a UE, and may be a cell-radio network temporary identifier (C-RNTI), an RACH preamble index or RACH preamble identifier (RAPID), an SR logical index or the like.

In this case, the SR logical index may be transmitted to an UE through an SR configuration (SchedulingRequestConfig) message.

That is, the SchedulingRequestConfig message may include an sr-LogicalIndex parameter.

The sr-LogicalIndex parameter indicates logical index information of an SR and is a parameter for mapping a contention resource for the SR.

In the case of a connected UE to which a C-RNTI has been allocated, the corresponding UE notifies an eNB that data is its own data by transmitting the C-RNTI MAC control element or SR logical index MAC CE within an MAC PDU.

In the case of an idle UE to which a C-RNTI has not been allocated, the idle UE notifies an eNB that data is its own data by essentially transmitting an RACH Preamble index MAC control element within an MAC PDU.

Table 6 below shows an example of LCID values for an UL-shared channel (SCH), which are proposed in this specification.

In this case, the LCID indicates a logical channel identification field and identifies a logical channel corresponding to a corresponding MAC SDU or identifies the type of corresponding MAC control element and padding.

If an MAC SDU is associated with a subheader, the LCID may indicate an MAC SDU corresponding to which logical channel. If an MAC control element is associated with a subheader, the LCID may indicate which MAC control element.

TABLE 6

| Index | LCID values |
| --- | --- |
| 00000 | CCCH |
| 00001-01010 | Identity of the logical channel |
| 01011 | CCCH |
| 01100-10101 | Reserved |
| 10110 | SR Logical index |
| 10111 | RACH Preamble index |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | the short BSR |
| 11110 | the long BSR |
| 11111 | Padding |

Furthermore, FIGS. 32a to 32c are diagrams illustrating examples of MAC control element (CE) formats of respective values corresponding to UE recognizer information of Table 6.

That is, FIG. 32a shows that UE recognizer information is a C-RNTI and an MAC PDU includes a C-RNTI MAC CE. FIG. 32b shows that UE recognizer information is an RAPID and an MAC PDU includes an RACH Preamble index (or identifier) (RAPID) MAC CE. FIG. 32c shows that UE recognizer information is an SR logical index and an MAC PDU includes an SR logical index MAC CE.

Detailed examples of the UE recognizer information are described later.

The MAC PDU may be an MAC PDU including a BSR, an MAC PDU including actual data or an MAC PDU including an RRC message, such as an RRC connection request.

Figure 32:
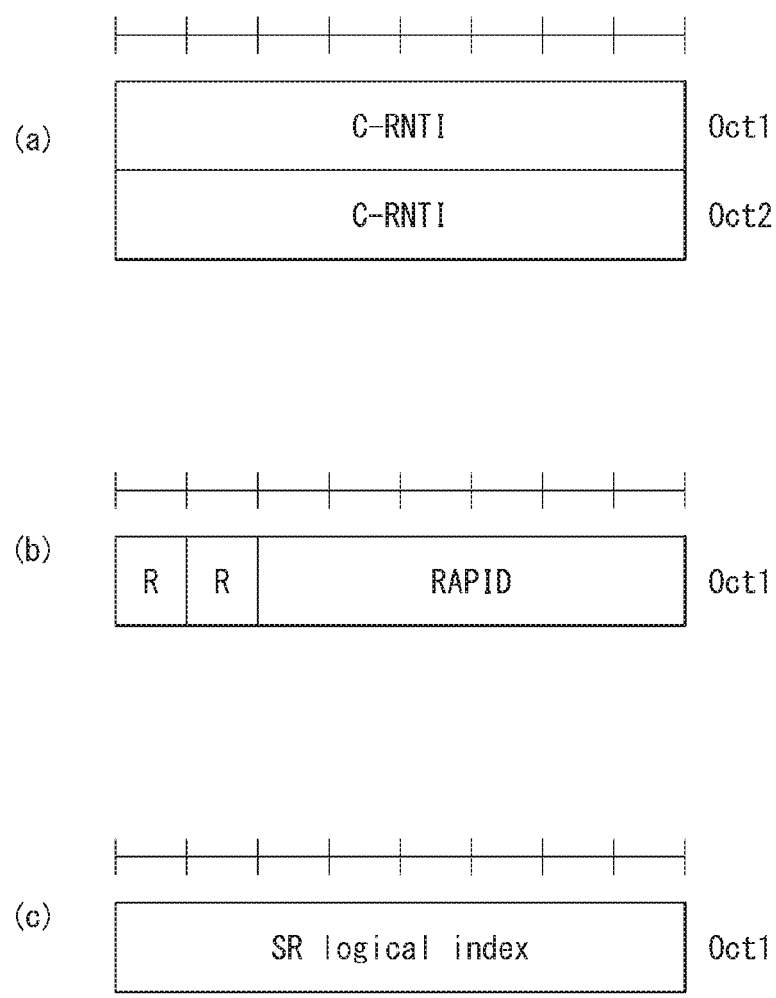
FIG. 32 is a diagram illustrating examples of MAC control element (CE) formats of values corresponding to UE recognizer information.

Embodiments of methods of recognizing a UE in the aforementioned CPRB collision situation based on a method of transmitting UE recognizer information using the MAC CE described with reference to FIG. 32 are described in more detail below.

First Embodiment

The first embodiment shows a UE recognition method in the CPRB collision of a BSR.

FIG. 32 is a diagram illustrating examples of MAC control element (CE) formats of values corresponding to UE recognizer information.

Specifically, FIG. 33a shows an example of a BSR MAC PDU format, and FIG. 33b is a diagram illustrating a method for recognizing a UE through a BSR MAC PDU including UE recognizer information.

That is, FIG. 33 is a method for recognizing, by an eNB, a UE when a CPRB collision is generated because two or more UEs select the same CPRB if the UE transmits a BSR using a contention resource (CPRB).

FIG. 33 shows a method of transmitting a C-RNTI MAC control element or SR logical index MAC CE that provides notification of its own C-RNTI when a UE transmits data using a CPRB in order for an eNB to accurately recognize the UE when a CPRB collision is generated.

In this case, it is preferred that the UE adds a UE identifier that belongs to a C-RNTI or SR logical index and that generates smaller overhead to an MAC header.

Referring to FIG. 33a, a BSR MAC PDU 3300 includes an MAC header field 3310, a C-RNTI MAC CE field 3320, a BSR MAC CE field 3330 and a padding field 3340.

The MAC header field 3310 includes LCID values indicative of an MAC CE and padding that are included in the MAC PDU.

Specifically, the MAC header field 3310 includes (1) an LCID value (0b11011) indicative of a C-RNTI MAC CE, (2) an LCID value (0b11101) indicative of a (short) BSR MAC CE, and (3) an LCID value (11111) indicative of padding.

The padding field may be included or may not be included, if necessary.

Referring to FIG. 33b, a UE 1 and a UE 2 transmit SRs to an eNB and transmit respective BSR MAC PDUs, each including recognizer information (a C-RNTI or SR logical index) of each UE, to the eNB simultaneously with the SR transmission (or after the SR transmission) (S3310).

In this case, it is assumed that the eNB has recognized a BSR collision due to the transmission of the BSR MAC PDUs through the same CPRB "CPRB #1" of the UE 1 and the UE 2 and has successfully received only the BSR transmitted by any one UE. It is assumed that the eNB has successfully received the SRs.

In this case, the eNB may recognize a UE (UE 2) from which the BSR has been successfully received based on the UE recognizer information.

Accordingly, the eNB transmits an UL grant for actual data to the UE (UE 2) from which the BSR has been successfully received and transmits an UL grant for a BSR to a UE (UE 1) from which the BSR has not been successfully received (S3320).

Second Embodiment

The second embodiment shows a UE recognition method in a CPRB collision of actual data.

FIG. 34 is a diagram illustrating another example of a UE recognition method using UE recognizer information proposed in this specification.

Specifically, FIG. 34a shows an example of an actual data MAC PDU format, and FIG. 34b is a diagram illustrating a method for recognizing a UE through the actual data MAC PDU including UE recognizer information.

That is, FIG. 34 is a method for recognizing, by an eNB, a UE when a CPRB collision is generated because two or more UEs select the same CPRB if the UE transmits actual data using a contention resource (CPRB).

FIG. 34 shows a method of transmitting, by a UE, data along with a C-RNTI MAC control element or SR logical index MAC CE providing notification of its own C-RNTI when the UE transmits the data using a CPRB so that an eNB can accurately recognize the UE when a CPRB collision is generated.

In this case, it is preferred that the UE adds a UE identifier that belongs to the C-RNTI or SR logical index and that generates lesser overhead to an MAC header.

Referring to FIG. 34a, the actual data MAC protocol data unit (PDU) 3400 includes an MAC header field 3410, a C-RNTI MAC CE field 3420, an MAC service data unit (SDU) field 3430 and a padding field 3440.

The MAC header field 3410 includes LCID values indicative of an MAC CE, an MAC SDU and padding that are included in the MAC PDU.

Specifically, the MAC header field includes (1) an LCID value (0b11011) indicative of a C-RNTI MAC CE, (2) an LCID value (an LCID for DTCH) indicative of an MAC SDU, and (3) an LCID value (11111) indicative of padding.

The padding field may be included or may not be included, if necessary.

Referring to FIG. 34b, a UE 1 and a UE 2 transmit SRs to an eNB and transmits respective actual data MAC PDUs, each including recognizer information (a C-RNTI or SR logical index) of each UE, to the eNB simultaneously with the SR transmission (or after the SR transmission) (S3410).

In this case, it is assumed that the eNB has recognized an actual data collision because the UE 1 and the UE 2 transmitted the actual data MAC PDUs through the same CPRB "CPRB #1" and has successfully received only the actual data transmitted by any one UE. It is assumed that the eNB has successfully received the SRs (PUCCH indices 1 and 7).

In this case, the eNB may recognize a UE (UE 2) from which the actual data has been successfully received based on the UE recognizer information.

Accordingly, the eNB transfers the corresponding actual data to a gateway (GW) through an EPS bearer of the UE (UE 2) from which the actual data has been successfully received (S3420).

Furthermore, the eNB transmits an UL grant from actual data transmission to a UE (UE 1) from which actual data has not been successfully received (S3430).

Third Embodiment

The third embodiment is a method for recognizing a UE when a CPRB collision is generated in an RACH SR procedure.

First, in the RACH SR procedure, a procedure is the same as a procedure performed by a UE in the connected state (connected UE) and a UE in the idle state (idle UE) as described above, but a transmitted message or data is different.

A method of transmitting, by the connected UE, UE recognizer information in the RACH SR procedure is different from that of FIGS. 33 and 34 if the UE transmits a PRACH preamble index instead of transmitting a PUCCH SR, and other operations are performed in the same manner.

That is, the UE transmits a C-RNTI MAC CE and BSR (or actual data) along with the PRACH preamble index using the same method as that of FIGS. 33 and 34.

That is, the MAC PDU format and the MAC PDU transmission procedure described with reference to FIGS. 33 and 34 are the same.

In the case of the idle UE, in the RACH SR procedure, when the UE transmits specific data (RRC connection request message) through a CPRB, a CPRB collision from two or more UEs may be generated.

Even in this case, likewise, in order for an eNB to correctly recognize a UE related to specific data that has been successfully received, when the UE transmits data using a CPRB, it essentially transmits an RACH preamble index MAC control element providing notification of its own UE ID.

FIG. 35 is a diagram illustrating yet another example of a UE recognition method using UE recognizer information which is proposed in this specification.

Specifically, FIG. 35a shows an example of an MAC PDU format including UE recognizer information in the RACH SR procedure. FIG. 35b is a diagram illustrating a method for recognizing a UE through the MAC PDU including UE recognizer information in the RACH SR procedure.

Furthermore, FIG. 35 may be applied to all of procedure for a connected UE and idle UE to perform an RACH SR procedure.

Referring to FIG. 35a, the MAC PDU 3500 includes an MAC header field 3510, a random access preamble index (or identifier) (RAPID) MAC CE field 3520, a BSR or MAC SDU field 3530 and a padding field 3540.

The MAC header field 3510 includes LCID values indicative of an MAC CE and padding that are included in the MAC PDU.

Specifically, the MAC header field 3510 includes (1) an LCID value (0b10111) indicative of an RAPID MAC CE, (2) an LCID value (0b11101) indicative of a DTCH, and (3) an LCID value (11111) indicative of padding.

The padding field may be included or may not be included, if necessary.

Referring to FIG. 35b, a UE 1 and a UE 2 transmit a PRACH (preamble) index #1 and a PRACH index #7, respectively, to an eNB and transmit respective MAC PDUs, each including identifier information (RAPID) of each UE, to the eNB simultaneously with the transmission of the PRACH indices #1 and #7 (or after the SR transmission) (S3510).

In this case, it is assumed that the eNB has recognized a BSR collision because the UE 1 and the UE 2 has transmitted the BSR MAC PDUs through the same CPRB "CPRB #1" and has successfully received only one BSR transmitted by any one UE. It is assumed that the eNB has successfully received the PRACH preamble indices "#1 and #7."

In this case, the eNB may recognize a UE (UE 2) from which the BSR has been successfully received based on the UE recognizer information.

Accordingly, the eNB transmits an UL grant for actual data to the UE (UE 2) from which the BSR has been successfully received and transmits an UL grant for a BSR to a UE (UE 1) from which the BSR has not been successfully received (S3520).

Figure 36:
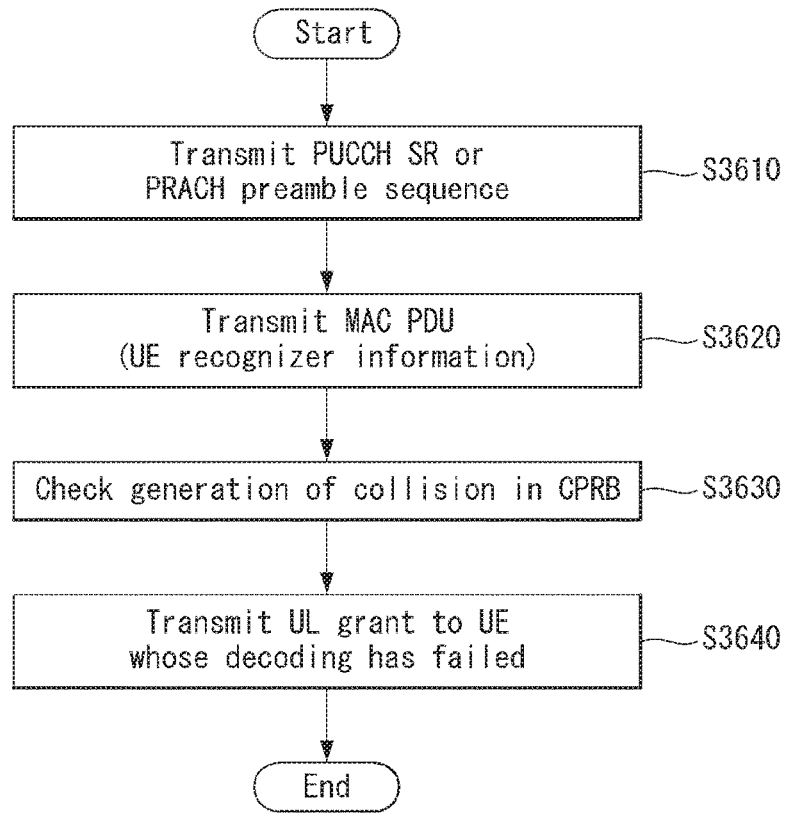
FIG. 36 is a flowchart illustrating an example of a data transmission/reception method including UE recognizer information which is proposed in this specification.

FIG. 36 is a flowchart illustrating an example of a data transmission/reception method including UE recognizer information which is proposed in this specification.

First, a UE transmits a preamble sequence (PRACH preamble sequence) to an eNB through an SR (PUCCH SR) or PRACH through a PUCCH (S3610).

In this case, the UE may be the connected state or the idle state.

If the UE is the connected state, the UE transmits a PUCCH SR to the eNB. If the UE is the idle state, the UE transmits a PRACH preamble sequence to the eNB.

Furthermore, the UE transmits an MAC PDU, including UE recognizer information, to the eNB using a contention resource (S3620).

The MAC PDU may be a BSR, actual data, an RRC message or the like and may be expressed as specific data or UL data.

In this case, each UE may transmit a PUCCH SR having a different PUCCH index and may transmit a PRACH preamble index having a different PRACH preamble index.

The contention resource may mean the aforementioned CP zone or CPRB.

The UE recognizer information refers to information indicative of information by which the eNB can recognize the UE, and may be a C-RNTI, an RAPID, an SR logical index or the like.

The UE recognizer information may be included in the MAC PDU in an MAC CE form. In this case, an LCID value indicative of a corresponding UE identifier value may be included in an MAC header.

Thereafter, the eNB checks whether a collision has been generated because two or more UEs transmitted MAC PDUs through the same CPRB (S3630).

If, as a result of the check, the generation of a collision is detected, the eNB transmits an UL grant for the MAC PDU to a corresponding UE so that the corresponding UE can transmit the MAC PDU that has not been successfully received using the UE recognizer information (S3640).

Figure 37:
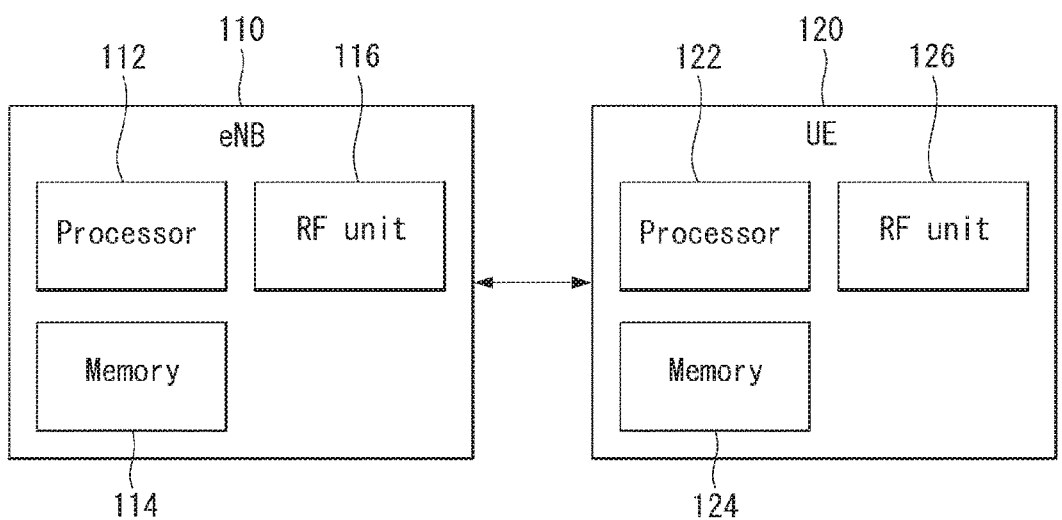
FIG. 37 illustrates a block diagram of a communication apparatus according to an embodiment of the present invention.

FIG. 37 illustrates a block diagram of a communication apparatus according to an embodiment of the present invention.

Referring to FIG. 37, a wireless communication system includes an eNB 110 and a UE 120. If the wireless communication system includes a relay, the eNB or the UE may be substituted with the relay.

In downlink, a transmitter may be part of the eNB 110 and a receiver may be part of the UE 120. In uplink, a transmitter may be part of the UE 120 and a receiver may be part of the eNB 110.

The eNB 110 includes a processor 112, memory 114 and a radio frequency (RF) unit 116. The processor 112 may be configured to implement the procedures and/or methods proposed by the present invention. The memory 114 is connected to the processor 112 and stores a variety of types of information related to the operation of the processor 112. The RF unit 116 is connected to the processor 112 and transmits and/or receives a radio signal. The UE 120 includes a processor 122, memory 124 and an RF unit 126. The processor 122 may be configured to implement the procedures and/or methods proposed by the present invention. The memory 124 is connected to the processor 122 and stores a variety of types of information related to the operation of the processor 122. The RF unit 126 is connected to the processor 122 and and/or receives a radio signal.

It is evident to those skilled in the art that the present invention may be materialized in other specific forms without departing from the spirit and essential characteristics of the present invention. Accordingly, the detailed description should not be construed as being limited from all aspects, but should be considered to be illustrative. The range of right of the present invention should be determined by reasonable analysis of the attached claims, and all changes within the equivalent range of the present invention are included in the range of right of the present invention. Furthermore, It is evident that in the claims, one or more embodiments may be constructed by combining claims not having an explicit citation relation or may be included as a new claim by amendments after filing an application.

INDUSTRIAL APPLICABILITY

The embodiments of the present invention may be applied to various wireless access systems. Examples of the various wireless access systems include 3rd generation partnership project (3GPP) and 3GPP2 and/or an Institute of Electrical and Electronic Engineers 802 (IEEE 802.xx) system. The embodiments of the present invention may be applied to all of technological fields, that is, the applications of the various wireless access systems, in addition to the various wireless access systems.

What is claimed is:

1. A method for transmitting/receiving a medium access control protocol data unit (MAC PDU) in a wireless communication system, the method performed by a user equipment (UE) comprising:
   receiving a contention based PUSCH (CP) zone configuration-related information from a base station (BS);
   transmitting a control signal to the BS through a physical uplink channel; and
   determining a contention resource for transmitting the MAC PDU in one or more resource blocks forming the CP zone based on the received CP zone configuration-related information,
   wherein the CP zone is a resource region in which the UE can transmit UL data to the BS without allocating an uplink grant from the BS,
   wherein the CP zone is included in a physical uplink shared channel (PUSCH) resource region,
   wherein the MAC PDU is transmitted to the BS through the determined contention resource,
   wherein the MAC PDU comprises UE recognizer information identifying the UE,
   wherein the MAC PDU comprises an MAC header and an MAC control element (CE),
   wherein the UE recognizer information is included in the MAC CE, and
   wherein the MAC header comprises a logical channel identification (LCID) value indicative of the UE recognizer information.

2. The method of claim 1, wherein the physical uplink channel is a physical uplink control channel (PUCCH) or a physical random access channel (PRACH).

3. The method of claim 2, wherein:
   if the physical uplink channel is the PUCCH, the control signal is a scheduling request (SR), and
   if the physical uplink channel is the PRACH, the control signal is a PRACH preamble sequence.

4. The method of claim 1, wherein the UE recognizer information is a cell-radio network temporary identifier (C-RNTI), a random access preamble identifier (RAPID) or an SR logical index.

5. The method of claim 1, wherein:
   the contention resource is a contention based PUSCH resource block (CPRB), and
   the PUSCH resource region comprises one or more CP zones depending on use in accordance with an intended use.

6. The method of claim 1, wherein the contention resource is determined based on at least one of a resource related to a scheduling request (SR) or the UE recognizer information.

7. The method of claim 1, wherein the MAC PDU is an MAC PDU comprising a buffer status report (BSR), an MAC PDU comprising actual data, or an MAC PDU comprising an RRC message.

8. The method of claim 1, wherein the MAC PDU is transmitted simultaneously with the control signal or transmitted after one subframe (SF) from the transmission of the control signal.

9. The method of claim 3, wherein the contention resource is based on an index of a resource for the scheduling request (SR).

10. The method of claim 9, wherein the index of the resource for the scheduling request (SR) is a physical index or logical index of an uplink resource in which the SR is transmitted.

11. A user equipment for transmitting/receiving a medium access control protocol data unit (MAC PDU) in a wireless communication system, the user equipment comprising:
    a radio frequency (RF) unit for transmitting/receiving a radio signal; and
    a processor, wherein:
    the processor receives a contention based PUSCH (CP) zone configuration-related information from a base station (BS), transmits a control signal to the BS through a physical uplink channel, and determines a contention resource for transmitting the MAC PDU in one or more resource blocks forming the CP zone based on the received CP zone configuration-related information, the CP zone is a resource region in which the UE can transmit UL data to the BS without allocating an uplink grant from the BS, the CP zone is included in a physical uplink shared channel (PUSCH) resource region, the MAC PDU is transmitted to the BS through the determined contention resource, the MAC PDU comprises UE recognizer information identifying the UE, the MAC PDU comprises an MAC header and an MAC control element (CE), the UE recognizer information is included in the MAC CE, and the MAC header comprises a logical channel identification (LCID) value indicative of the UE recognizer information.

* * * * *